US012438883B2

(12) United States Patent
Venkatesan et al.

(10) Patent No.: US 12,438,883 B2
(45) Date of Patent: Oct. 7, 2025

(54) REGION-BASED SECURITY POLICIES FOR CLOUD RESOURCES

(71) Applicant: Microsoft Technology Licensing, LLC, Redmond, WA (US)

(72) Inventors: Ramarathnam Venkatesan, Redmond, WA (US); Nishanth Chandran, Bangalore (IN); Srinath T. V. Setty, Redmond, WA (US); Christoph Berlin, Bellevue, WA (US); Ulrich Homann, Kirkland, WA (US); Michael James Zwilling, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 273 days.

(21) Appl. No.: 18/319,023

(22) Filed: May 17, 2023

(65) Prior Publication Data
US 2024/0388589 A1    Nov. 21, 2024

(51) Int. Cl.
*H04L 9/40*    (2022.01)

(52) U.S. Cl.
CPC .......... *H04L 63/107* (2013.01); *H04L 63/102* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,614,085 B2* | 11/2009 | Ben-Itzhak | ......... | H04L 63/1433 726/1 |
| 11,706,260 B2* | 7/2023 | Dozorets | ............... | H04L 63/107 726/1 |
| 2016/0198309 A1* | 7/2016 | Yoo | .......... | H04W 4/33 455/456.1 |
| 2016/0366102 A1* | 12/2016 | Smith | ................ | H04L 9/0841 |
| 2022/0121765 A1* | 4/2022 | Foong | .................... | G06F 21/64 |
| 2023/0087557 A1* | 3/2023 | Dai | ....................... | H04L 9/3073 713/160 |

(Continued)

OTHER PUBLICATIONS

International Search Report and Written Opinion received for PCT Application No. PCT/US2024/026712, Sep. 3, 2024, 12 pages.

(Continued)

*Primary Examiner* — Atta Khan
(74) *Attorney, Agent, or Firm* — Weaver IP L.L.C.

(57) ABSTRACT

An entity is enabled to access encrypted resources in response to verifying access criteria of a region-based security policy is met. For example, a resource request to access an encrypted resource is received from an entity. A determination that the encrypted resource is assigned to a first region and is protected by a region-based security policy is made. A proof of a region attribute indicating that the entity possesses the region attribute is received from the entity, the region attribute indicates the entity is associated with the first region. An encrypted version of the region attribute is obtained from a ledger database. The resource request is validated based at least on the encrypted attribute and the proof of the region attribute. A verification is made that an access criteria of the region-based security policy is met. The entity is provided access to the encrypted resource.

20 Claims, 8 Drawing Sheets

(56) References Cited

U.S. PATENT DOCUMENTS

2024/0388589 A1* 11/2024 Venkatesan ........... H04L 63/102

OTHER PUBLICATIONS

Mounnan, et al., "Efficient Distributed Access Control Using Blockchain for Big Data in Clouds", The Fifteenth International Conference on Wireless and Mobile Communications, Jun. 30, 2019, pp. 53-62.

* cited by examiner

530

Decrypt the encrypted resource — 532

Provide the decrypted resource to the entity — 534

Authorize a resource handler to decrypt the resource and provide the decrypted resource to the entity — 542

Receive a digest representative of a state of the ledger database from the entity — 602

Validate the ledger database based at least on the digest — 604

Receive, from the ledger database, a response comprising the encrypted attribute — 606

FIG. 6

REGION-BASED SECURITY POLICIES FOR CLOUD RESOURCES

BACKGROUND

Cloud computing platforms may be used to securely store or manage resources. These resources may be secured (e.g., encrypted) using different security policies. Systems may determine whether or not a user should be provided access to the resource based on the security policies utilized. For instance, government authorities may set security policies based on local laws and regulations to protect the privacy of its citizens.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable an entity to access encrypted resources in response to verifying access criteria of a region-based security policy is met. For example, a resource request to access an encrypted resource is received from an entity. A determination that the encrypted resource is assigned to a first region and is protected by a region-based security policy is made. A proof of a region attribute is received from the entity. The proof indicates the entity possesses the region attribute. The region attribute indicates the entity is associated with the first region. An encrypted attribute is obtained from a ledger database. The encrypted attribute is an encrypted version of the region attribute. The resource request is validated based at least on the encrypted attribute and the proof of the region attribute. A verification is made that an access criteria of the region-based security policy is met. The entity is provided access to the encrypted resource. As an example, embodiments enable an entity to access an encrypted resource if the proof of the attribute indicates that the entity is associated with the first region.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 5C shows a flowchart of a process for providing a decrypted resource to an entity in accordance with an embodiment.

FIG. 5D shows a flowchart of a process for authorizing a resource handler to provide a decrypted resource to an entity in accordance with an embodiment.

FIG. 6 shows a flowchart of a process for obtaining an encrypted attribute from a ledger database in accordance with an embodiment.

Figure 1:
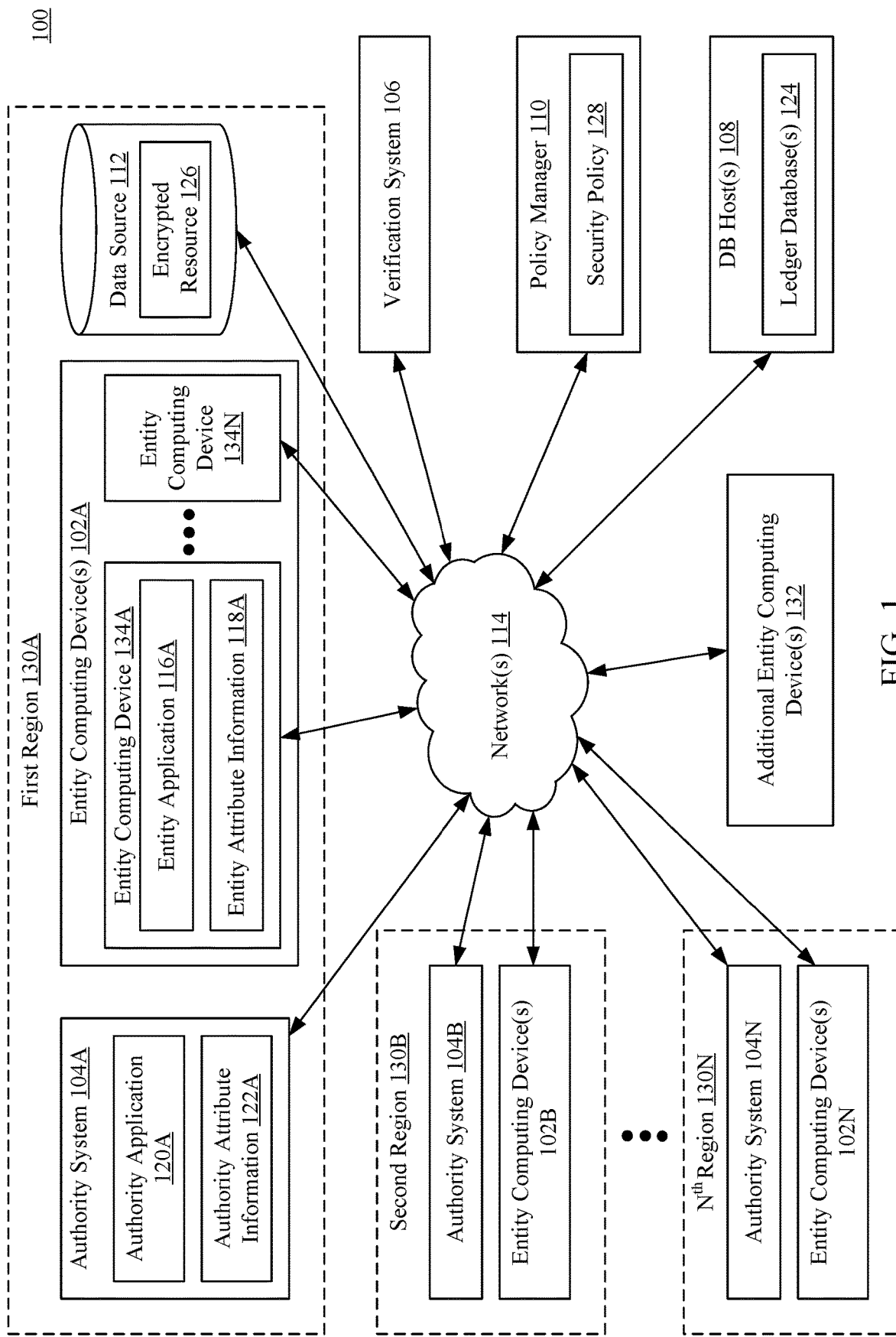
FIG. 1 shows a block diagram of an example system for providing access to a resource protected by a region-based security policy, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

"Cloud computing" refers to the on-demand availability of computer system resources (e.g., applications, services, processors, storage devices, file systems, and databases) over the Internet and data stored in cloud storage. Servers hosting cloud-based resources may be referred to as "cloud-based servers" (or "cloud servers"). A "cloud computing service" refers to an administrative service (implemented in hardware that executes in software and/or firmware) that manages a set of cloud computing computer system resources. Cloud computing platforms may be used to securely store or manage resources. These resources may be secured (e.g., encrypted) using different security policies. Systems may determine whether or not a user should be provided access to the resource based on the security policies utilized.

In some scenarios, an authority or other entity desires to protect access to a resource based on a region the resource is assigned to. For instance, a government authority may desire the restricting of access to data of its citizens based on privacy laws and regulations. Suppose, for example, the government authority desires restricted access to the privacy data only to citizens of the government's region (e.g., city, county, province, state, country, etc., or groups thereof). In this context, a cloud computing platform operates as a "sovereign cloud" that is configured to provide data access in compliance with local laws and regulations. A sovereign cloud service provider protects each subscriber's data (including metadata) from access by entities not associated with the government's region and stores the data in compliance with the government authority's privacy mandates. If the sovereign cloud service provider fails sovereignty assessments, it may face penalty or damage reimbursement costs caused by rogue access.

In some implementations of sovereign clouds, a sovereign cloud service provider establishes a data center within a region and stores data protected under security policies of that region's government authority in that data center. However, operating a data center in each region serviced by the sovereign cloud service provider can be costly (e.g., economically and in terms of compute resources required) due to factors such as, but not limited to, the increased economic cost to build and maintain a data center, the number of compute resources required to operate a data center, supporting services and resources used to maintain and/or otherwise service the data center, and/or other factors that increase the cost in running a datacenter. Furthermore, some regions may be cheaper or require less resources to operate a data center than other resources. For instance, a sovereign cloud service provider that has a data center already established in a first region may wish to use that data center to provide a sovereign cloud to customers/users of multiple regions. As another example, it may be less expensive to operate a data center in a first region than a second region. As another example, a sovereign cloud service provider that provides services to many customers in a first region and a relatively smaller number of customers in a second region, may wish to use the same data center to store data for customers in both regions.

Further still, some regions pose physical risks to facilities of the cloud service provider and the physical hardware that stores entities' data/resources. For instance, suppose a region is prone to natural disasters (e.g., earthquakes, tornados, tsunamis, and/or the like). In this case, a sovereign cloud service provider may have to operate multiple data centers in separate locations within the same region in order to mitigate the impact if a data center is disabled or destroyed by such a disaster. In some cases, a region may be too small to operate multiple data centers in a manner that effectively mitigates a potential impact from a natural disaster (e.g., a tsunami or earthquake affecting a portion of the region is likely to impact the entirety of the region).

Thus, a sovereign cloud service provider may desire to store data protected by a region-based security policy of a first region at a data center that is physically located in a second (i.e., different) region.

One potential security vulnerability in storing resources that are protected by a region-based security policy of a first region at a data center that is physically located in a second region arises when an unauthorized entity (e.g., a malicious entity (e.g., a hacker) or a foreign entity (e.g., a government authority of the second region)) compromises the physical location of the data center or otherwise obtains access to a physical storage device (e.g., a server, a hard drive, a computing device, etc.) that stores a resource protected by the policy. Another potential security vulnerability arises if a trusted component (e.g., a hardware component, an application, and/or a combination of a hardware and software component) that enforces the policy for accessing the protected resource is compromised. Another potential security vulnerability arises if a trusted component that maintains access information for users is compromised. In any case, if an unauthorized entity manages to infiltrate the data center or other trusted component, the unauthorized entity may obtain access to resources protected by the region-based security policy.

Embodiments described herein implement region-based security policies for cloud resources. For example, a resource request to access an encrypted resource (e.g., private data of a citizen of a first region, "Region A") is received from an entity (e.g., the citizen of Region A, "Entity A"). A determination that the encrypted resource is assigned to a first region (e.g., Region A) and is protected by a region-based security policy (e.g., as established by a government authority of Region A, "Government A"). A proof of a region attribute is received from the entity, the proof indicates that the entity possesses the region attribute (e.g., proof that Entity A is assigned an attribute indicating that Entity A is associated with Region A (e.g., as a citizen of Region A)). Examples of region attributes include, but are not limited to, an attribute indicating the entity is located in the first region, an attribute indicating the entity is a citizen of the first region, an attribute indicating the entity is a resident of the first region, an attribute indicating the entity is an organization associated with the first region (e.g., an organization that is headquartered in the first region, an organization that provides goods and/or services to the first region, and/or an organization that otherwise conducts business in the first region), an attribute indicating the entity is a service assigned to the first region (e.g., a service operating on behalf of another entity associated with the first region, a service that maintains data on behalf of an authority of the first region, etc.), an attribute that indicates the entity is a government entity of the first region (e.g., Government A, an employee of Government A, another government of Region A (e.g., a government of a subset of Region A), etc.), and/or any other attribute that indicates an appropriate region-related characteristic of the entity required by the region-based security policy, as would be understood by one ordinarily skilled in the relevant art(s) having benefit of this disclosure and/or as described elsewhere herein. An encrypted attribute is obtained from a ledger database, the encrypted attribute is an encrypted version of the region attribute. The resource request is validated based at least on the encrypted attribute and the proof of the region attribute. A verification is made that an access criteria of the region-based security policy is met. The entity (e.g., Entity A) is provided with access to the encrypted resource (e.g., Entity A's private data).

The techniques described herein provide cryptographic enforcement of an authority's region-based security policies for cloud resources associated with entities. Entities are any type of user (e.g., individual users, employee users, agent users, customer users, family member users, etc.), groups of users, organizations (e.g., enterprises, non-profit companies, non-profit groups, governmental institutions, governmental bodies, and governmental agencies, etc.), and/or services (e.g., cloud services, enclave services, service principals, etc.) that store, request access to, access, and/or otherwise interact with resources of a cloud platform. An authority is any type of individual user, group of users, and/or organization that determines whether or not an entity should be associated with the region the authority is associated with and/or that determines and/or enforces region-based security policies. Examples of authorities include authority organizations (e.g., governmental institutions of a region, governmental bodies of a region, governmental agencies of a region, enterprises (or departments thereof) within a region, non-profit groups within a region, and/or the like), individual authority users (e.g., individual authorities, agents of an authority organization, etc.), and groups of authority users.

The techniques described herein provide cryptographic enforcement, in a zero-trust model (and other models), end-to-end across various types of data, services, and organizations. In particular, one or more components (e.g., component(s) that perform request validation, policy verification, and/or providing of resource access) may not be considered "trusted." Such untrusted components are not entrusted to store sensitive data, such as decryption keys used to decrypt encrypted resources, due to a risk of the sensitive data being compromised thereon. Instead, such component(s) simply maintain the necessary information to release such keys. Thus, an authority does not have to rely on a sovereign cloud service provider to decrypt the resources protected by region-based security policies. In this context, even if an unauthorized entity compromises services of the sovereign cloud service provider, the unauthorized entity is unable to access decrypted versions of resources protected by region-based security policies.

Accordingly, the techniques described herein advantageously provide improvements in other technologies, namely data encryption, security, and privacy. For instance, by utilizing a zero-trust model, access to sensitive resources (e.g., personal or private information) and/or decryption keys used to decrypt such resources, is prevented. Consequently, the techniques described herein also prevent access to a user's network and computing resources (e.g., computing devices, virtual machines, etc.). By mitigating the access to such computing resources, the unnecessary expenditure of associated central processing units (CPUs), storage devices, memory, power, etc., is also mitigated. Accordingly, the embodiments described herein also improve the functioning of the computing devices on which such compute resources are utilized/maintained, as such compute resources are conserved as a result from preventing an unauthorized entity from utilizing such compute resources.

Furthermore, unauthorized access to personal and/or confidential information is prevented by associating encrypted attributes with identities of respective entities. Consequently, the techniques described herein prevent an unauthorized entity from accessing personal and/or confidential information protected by a security policy that utilizes encrypted attributes without possessing the attribute. For instance, a region-based security policy in accordance with an embodiment requires proof that an entity possesses an attribute that satisfies an access criteria of the region-based security policy before authorizing access to resources protected by the security policy. A validator validates the proof and a verifier verifies that an access criteria of the region-based security policy is met, if the proof is valid and the verification is made, an entity is provided access to the resource protected by the region-based security policy. Consequently, the techniques described herein also prevent access to network and computing resources (e.g., computing devices, virtual machines, etc.) accessible to users with a corresponding decryption key and/or data protected by the region-based security policy. By mitigating the access to such computing resources, the unnecessary expenditure of central processing units (CPUs), storage devices, memory, power, etc., associated with such resources is also mitigated. Accordingly, the embodiments described herein also improve the functioning of the computing entity on which such compute resources are utilized/maintained, as such compute resources are conserved as a result from preventing an unauthorized entity from utilizing such compute resources.

Moreover, the parameters for a sovereign cloud service provider to implement a sovereign cloud may vary depending on the policies of the authority for a particular region. For instance, an authority for a first region requires strict requirements for protecting private data of its citizens and residents, while an authority of a second region allows businesses and individual users to determine how private data is secured in transit and at rest. As discussed elsewhere herein, in some embodiments, security policies (including the region-based security policy) are associated with (e.g., mapped to in a policy map) identifiers resources stored by the system of cloud service provider in a manner that allows authorities, entities, and users to apply various security policies to the resources.

FIG. 1 shows a block diagram of an example system 100 for providing access to a resource protected by a region-based security policy, in accordance with an example embodiment. As shown in FIG. 1, system 100 includes one or more entity computing device(s) 102A ("entity computing devices 102A" herein), one or more entity computing device(s) 102B ("entity computing devices 102B" herein), one or more entity computing device(s) 102N ("entity computing devices 102N" herein) (collectively "entity computing devices 102A-102N" herein). System 100 also includes authority systems 104A-104N, an verification system 106, one or more database host(s) 108 ("DB host 108" herein), a policy manager 110, a data source 112, and one or more additional entity computing device(s) 132 ("entity computing devices 132" herein). Entity computing devices 102A-102N and entity computing devices 132 comprise any type of processing devices, including, but not limited to, desktop computers, servers, mobile or handheld devices (e.g., tablets, personal data assistants (PDAs), smart phones, laptops, etc.), Internet-of-Things (IoT) devices, etc. Authority systems 104A-104N are any types of computing systems, including, but not limited to, one or more computing devices, enterprise computing systems, networked computing systems, etc. Verification system 106 comprises one or more server computers or computing devices, which include one or more distributed or "cloud-based" servers, in embodiments. In embodiments, verification system 106 is associated with, or a part of, a cloud-based service platform and in some embodiments, verification system 106 comprises on-premises server(s) in addition to, or in lieu of, cloud-based servers. In accordance with an embodiment, verification system 106 is a trusted verification system. In accordance with another embodiment, verification system 106 is an untrusted verification system. DB host 108 comprises one or more server computers or computing devices, which include one or more distributed or "cloud-based" servers, in embodiments. In embodiments, DB host 108 are associated with, or are a part of, a cloud-based service platform and in some embodiments, DB host 108 comprises one or more on-premise servers in addition to, or in lieu of, cloud-based server(s). DB host 108 is configured to host and execute any type of DB server application, such as but not limited to, Azure SQL Database™ from Microsoft Corporation of Redmond, WA. In embodiments, entity computing devices 102A-102N, authority systems 104A-104N, verification system 106, DB host 108, policy manager 110, data source 112, and/or entity computing devices 132, are communicatively coupled via one or more networks 114 ("network 114" herein). Network 114 comprises one or more of local area networks (LANs), wide area networks (WANs), enterprise networks, the Internet, etc., and includes one or more of wired and/or wireless portions.

As shown in FIG. 1, DB host 108 execute one or more ledger databases 124 ("ledger databases 124" herein). Each of ledger databases 124 provide tamper-evidence capabilities for database tables of the respective ledger database (referred to as ledger tables), where one can cryptographically attest to other parties, such as auditors or parties that the data maintained by the database has not been tampered with. Ledger databases 124 protect data from any attacker or high privileged user, including database administrators, system administrators, and cloud administrators. As with a traditional ledger, historical data is preserved. If a row is updated in a ledger table, its previous value is maintained and protected in a history table. Each of ledger databases 124 provide a chronicle of all changes made to the respective database over time. In accordance with an embodiment, historical data is maintained in a relational form to support queries (e.g., SQL queries) for auditing, forensics, and other purposes.

For each of ledger databases 124, any rows of the respective database that are modified by a transaction in the ledger table are cryptographically hashed (e.g., SHA-256 hashed) using a data structure, such as a Merkle tree, that creates a root hash representing all rows in the transaction. The transactions that the respective ledger databases process are then also hashed together through another Merkle tree data structure. The result is a root hash that forms a block. The block is then hashed through the root hash of the block, along with the root hash of the previous block as input to the hash function. That hashing forms a blockchain. The root hashes, also referred herein as database digests, contain the cryptographically hashed transactions and represent the state of the database at the time the digests were generated. In accordance with an embodiment, respective digests are periodically generated and stored outside the respective database in tamper-proof storage. Digests are later used to verify the integrity of the respective database by comparing the value of the hash in the respective digest against the calculated hashes in the respective database.

In accordance with an embodiment, materialized views of ledger tables are generated in fixed periodic intervals referred to as epochs. In accordance with an embodiment, each of ledger databases 124 are also configured to provide forward integrity, which guarantees that given a materialized view of a ledger table at any time t, it is infeasible to tamper the ledger table in any subsequent epoch.

Each ledger database of ledger databases 124 is configured to store and protect any type of data or information, including, but not limited to a verifiable identity map, a verifiable attribute map, and/or a verifiable policy map. Additional details with regards to verifiable identity maps, verifiable attribute maps, and verifiable policy maps are discussed with respect to FIGS. 2-5A, as well as elsewhere herein. Each of ledger databases 124 are configured to provide users (e.g., users of entity computing devices 102A-102N, authority systems 104A-104N, and/or entity computing devices 132) access to respective digests, which are representative of the state of the respective ledger database. Computing devices and/or systems may store the digests, as described further below with respect to FIGS. 2 and 3A. It is noted that in embodiments, ledger databases 124 are configured to provide access to some or all of the respective digests that are generated by the respective ledger database over time.

Each entity computing device of entity computing devices 102A-102N may include any number of computing devices (e.g., one computing device, more than one computing device, tens of computing devices, hundreds of computing devices, or even greater numbers of computing devices). For instance, as shown in FIG. 1, entity computing devices 102A-102N includes entity computing devices 134A-134N. Each computing device of entity computing devices 102A-102N is associated with a user (e.g., a user entity, or a user operating on behalf of another entity) and comprises a respective application and respective attribute information. For instance, as shown in FIG. 1, entity computing device 134A comprises an entity application 116A ("application 116A" herein) and entity attribute information 118A. Application 116A is any software application that is utilized to access resources (e.g., resources maintained by data source 112), encrypt resources (e.g., to generate encrypted resource 126), generate proofs of attributes (e.g., of entity attribute information 118A), access ledger databases (e.g., ledger databases 124), interface with an associated authority system (e.g., authority system 104A), interface with verification system 106, and/or otherwise interact with other computing devices, services, and/or components of system 100. Examples of application 116A include, but are not limited to, a messaging application (e.g., Microsoft Teams™ published by Microsoft Corporation of Redmond, WA), a word processing application (e.g., Microsoft Word™ published by Microsoft Corporation), a database application, etc. Each computing device of entity computing devices 102A-102N may include a respective application that is similar to application 116A, not shown in FIG. 1.

As stated above, application 116A is configured to access resources on behalf of a user (e.g., of entity computing device 134A). For example, application 116A accesses encrypted resource 126 maintained by data source 112. Data source 112 also comprises a policy ID specified for resources maintained thereby. In accordance with an embodiment, the policy ID is stored as metadata associated with the resource. Examples of data source 112 include, but are not limited to, a data store, a file repository, a database, etc. Examples of resources maintained by data source 112 include, but are not limited to, a data file (e.g., a document), a database object (e.g., a table, a directory, etc.), structured data, unstructured data, semi-structured data, a data container, a decryption key, etc. The resource may be encrypted (e.g., the resource is encoded in accordance with an encryption technique, such as, but not limited to, the Advanced Encryption Standard (AES)). In such a case, application 116A requires the data to be decrypted (e.g., decoded in accordance with a decryption technique, such as, but not limited to, the AES), for example, using a decryption key in order to access it. The data is decrypted if a policy (e.g., a region-based security policy, an attribute based access policy, and/or another type of access and/or security policy) associated with the resource is satisfied.

As stated above, entity computing device 134A includes entity attribute information 118A. Entity attribute information 118A includes information that proves an entity associated with entity computing device 134A (e.g., "Entity A") possesses one or more attributes. For instance, in a non-limiting example, Entity A is the user of entity computing device 134A. In this example, entity attribute information 118A includes citizen status of the user, residency of the user, employment status of the user, security clearance of the user, administrative status of the user, job position of the user, and/or any other characteristic that may be attributed to the user by an authority, as described herein. In accordance with an embodiment, application 116A provides (e.g., all of or a portion of) entity attribute information 118A to prove the entity possesses the attribute. Alternatively, application 116A generates a (e.g., cryptographic) proof of an attribute that indicates the entity possesses the attribute. Additionally details regarding generating proofs of attributes are discussed with respect to FIGS. 2, 3A, and 4-5B, as well as elsewhere herein.

Each of authority systems 104A-104N correspond to a respective authority. For instance, as shown in FIG. 1, authority system 104A corresponds to "Authority A," authority system 104B corresponds to "Authority B," and authority system 104N corresponds to "Authority N." Authorities utilize respective authority systems 104A-104N to maintain, generate, and/or manage respective ledger databases of ledger databases 124 and generate, implement, enforce and/or manage security policies (e.g., region-based security policies, attribute-based security policies, location-based security policies, identity-based security policies, etc.).

Each of authority systems 104A-104N may include one or more computing devices that execute applications and/or store data. For example, as shown in FIG. 1, authority system 104A comprises an authority application 120A (e.g., executing on a computing device of authority system 104A, not shown in FIG. 1) and authority attribute information 122A (e.g., stored in a storage device of authority system 104A or an external storage device accessible by authority system 104A, not shown in FIG. 1). Authority application 120A ("application 120A" herein) is any software application that is utilized to access resources (e.g., resources maintained by data source 112); encrypt resources (e.g., to generate encrypted resource 126); store resources; generate proofs of attributes (e.g., of attribute information 122A); maintain, generate, and/or manage ledger databases (e.g., ledger databases 124); generate, implement, enforce, and/or manage security policies; interface with an associated entity computing device (e.g., of entity computing devices 102A), interface with verification system 106, and/or otherwise interact with other computing devices, services, and/or components of system 100. Examples of application 120A include, but are not limited to, a messaging application (e.g., Microsoft Teams™ published by Microsoft Corporation of Redmond, WA), a word processing application (e.g., Microsoft Word™ published by Microsoft Corporation), a database application, etc. Each of authority systems 104B-104N may include a respective application that is similar to application 120A, not shown in FIG. 1.

Authority attribute information 122A includes information that proves an authority associated with authority system 104A (e.g., Authority A) possesses one or more attributes. For instance, in a non-limiting example, Authority A is a user operating on behalf of a government of Region A and authority attribute information 122A includes an attribute attributed to Authority A that indicates Authority A is authorized to set policies on behalf of the government of Region A. In accordance with an embodiment, application 120A provides (e.g., all of or a portion of) authority attribute information 122A to prove the authority possesses the attribute. Alternatively, application 120A generates a (e.g., cryptographic) proof of an attribute that indicates the authority possesses the attribute. Additionally details regarding generating proofs of attributes are discussed with respect to FIGS. 2, 3A, and 4-5B, as well as elsewhere herein.

Policy manager 110 maintains security policies for resources maintained by data source 112. Examples of security policies maintained by policy manager 110 include, but are not limited to, region-based security policies, attribute-based security policies, location-based security policies, and/or any other security policy that is used to determine whether an entity is authorized to access a resource maintained by data source 112. For instance, as shown in FIG. 1, policy manager 110 comprises a region-based security policy 128 of Authority A ("security policy 128" herein). In accordance with an embodiment, security policies maintained by policy manager 110 are stored in a respective policy map of ledger databases 124. In this context, policy manager 110 maintains the security policies on behalf of the authority that is associated with the respective policy. Further details regarding the maintenance of security policies are discussed with respect to FIGS. 2-5A, as well as elsewhere herein.

In accordance with an embodiment, the entity associated with entity computing device 134A (or other entity computing devices of entity computing devices 102A) is associated with an authority (e.g., as a member of the authority, an employee of the authority, a volunteer of the authority, an owner of the authority, a subscriber to a service of the authority, a department of the authority, a division of the authority, a partner organization of the authority, etc.). For example, in a non-limiting example, the user associated with entity computing device 134A is an employee of Authority A. In this context, computing device 134A may be a computing device within the authority system of the authority (e.g., authority system 104A) or another computing device associated with the user (e.g., a personal computing device).

Verification system 106 determines whether the policy for data attempted to be accessed by application 116A (or other similar application, not shown in FIG. 1), stored in data source 112 on behalf of an entity associated with one or more of entity computing devices 102A-102N and/or 132, and/or accessed by one of the authorities associated with authority systems 104A-104N (or applications and/or members associated with those authorities) is satisfied. For example, in accordance with an embodiment, verification system 106 facilities the determination as to whether a proof of a region attribute provided by an entity (e.g., entities associated with any of entity computing devices 102A-102N and/or entity computing devices 132) indicates the entity possesses a particular region attribute. Upon determining that the proof is valid, verification system 106 (or another component on behalf of verification system 106) stores an encrypted resource in data source 112 (e.g., as encrypted resource 126). Alternatively, an authority (or a user or service acting on behalf of an authority) (e.g., of authority systems 104A-104N) collects and/or generates resources associated with the entity and stores the resource in data source 112. Additional details regarding storing data protected by a security policy are described with respect to FIGS. 2 and 3B, as well as elsewhere herein.

In accordance with another embodiment, verification system 106 facilitates the determination of whether an authority is authorized to update a security policy (e.g., security policy 128). For instance, verification system 106 in accordance with an embodiment receives a proof of an authority attribute provided by an authority system (e.g., authority systems 104A-104N) or provided on behalf of an authority system (e.g., by a user or service associated with authority systems 104A-104N) that indicates the authority possesses a particular authority attribute. Upon determining that the proof of the authority attribute is valid, verification system 106 updates a security policy (e.g., security policy 128) managed by the authority system. In accordance with another embodiment, upon determining that the proof is valid, verification system 106 updates a ledger database (e.g., of ledger databases 124) managed by the authority system. Additional details regarding the update of security policies and ledger databases are described with respect to FIG. 3A, as well as elsewhere herein.

In accordance with another embodiment, verification system 106 determines whether an entity (e.g., entities associated with any of entity computing devices 102A-102N and/or entity computing devices 132) possess the necessary attribute(s) specified by a region-based security policy and provides the entity with access to a resource protected by the policy. Upon determining that access criteria of the policy is met, verification system 106 obtains (or recovers) the decryption key and/or provides the decryption key to the entity. Alternatively, verification system 106 (or another component coupled thereto) decrypts the resource using the decryption key, and the decrypted resource is provided to a requesting entity. Additional details regarding determining as to whether an entity possesses the region attribute (and, optionally, other attribute(s)) specified by a region-based security policy (and/or other policies) and providing the entity access to a resource protected by the policy are described with respect to FIGS. 4-8, as well as elsewhere herein.

In accordance with an embodiment, and as shown in FIG. 1, authority systems, computing devices, data sources, and encrypted resources are associated with a region. Depending on the implementation, an authority system, computing device, data source, and/or encrypted resources may be physically located in a region (e.g., stored, operating in, originated from, etc.) and/or assigned to a region. In this context, an authority system, computing device, data source, and/or encrypted resource that is assigned to a region may be owned by an entity that is associated with a region (e.g., an entity that is located in the region, an entity that is a citizen of the region, an entity that is resident of the region, an entity that is an employee of another entity or authority of the region, an entity that conducts business in the region (e.g., an organization that is headquartered in the region, an organization that has an office in the region, an organization that provides goods and/or services to the region), an entity that is a service assigned to the region, etc.), leased by an entity that is associated with a region, and/or otherwise assigned to a region without necessarily being physically located in the region. For instance, as a non-limiting example, suppose authority system 104A and entity computing devices 102A are assigned to a first region 130A ("Region A"), authority system 104B and entity computing devices 102B are assigned to a second region 130B ("Region B"), and authority system 104N and entity computing devices 102N are assigned to an $N^{th}$ region 130N ("Region N"). Any of the respective authority systems and/or entity computing devices may be located in their respective assigned region (e.g., stationary computing devices, stationary systems, mobile systems or computing devices that are within the region, etc.) or located in a different region (e.g., a remotely located stationary system or computing device, a mobile computing device (e.g., a mobile device or laptop of an entity that is traveling in another region), etc.). Furthermore, in this example, suppose data source 112 is physically located in Region A. Embodiments described herein enable resources assigned to any region (e.g., Region A, Region B, Region N, etc.) to be securely stored in data source 112 in compliance with security policies of the respective authorities of the respective assigned region (e.g., the authority of authority system 104A, the authority of authority system 104B, the authority of authority system 104N). Additional non-limiting examples of storing resources protected by region-based security policies are described with respect to FIGS. 7-8, as well as elsewhere herein.

III. Example Embodiments for Setting Policies and Securely Storing Resources Systems, computing devices, and computer storage mediums described herein may set region-based security policies for protecting resources and store resources protected by the policies in various ways, in embodiments. For instance, with continued reference to FIG. 1, suppose the authority of authority system 104A (Authority A) implements security policy 128 to protect data of citizens of first region 130A (Region A). Further, suppose Authority A collects data from citizens of Region A. In this context, Authority A stores the collected data by encrypting the data with an encryption key and storing the encrypted data in data source 112 as encrypted resource 126. In this context, Authority A stores a decryption key in a key manager (not shown in FIG. 1). The decryption key is encrypted with a policy key associated with security policy 128 so that, upon an entity proving they possess the appropriate attribute(s) to satisfy security policy 128, the decryption key may be decrypted and utilized (e.g., by the entity, by a verification system, by a resource handler, etc.) to access encrypted resource 126. In an alternative implementation, an entity (e.g., an entity associated with any of entity computing devices 102A-102N and/or entity computing devices 132) stores a resource of the entity in a manner that protects the resource under security policy 128 as encrypted resource 126.

Figure 2:
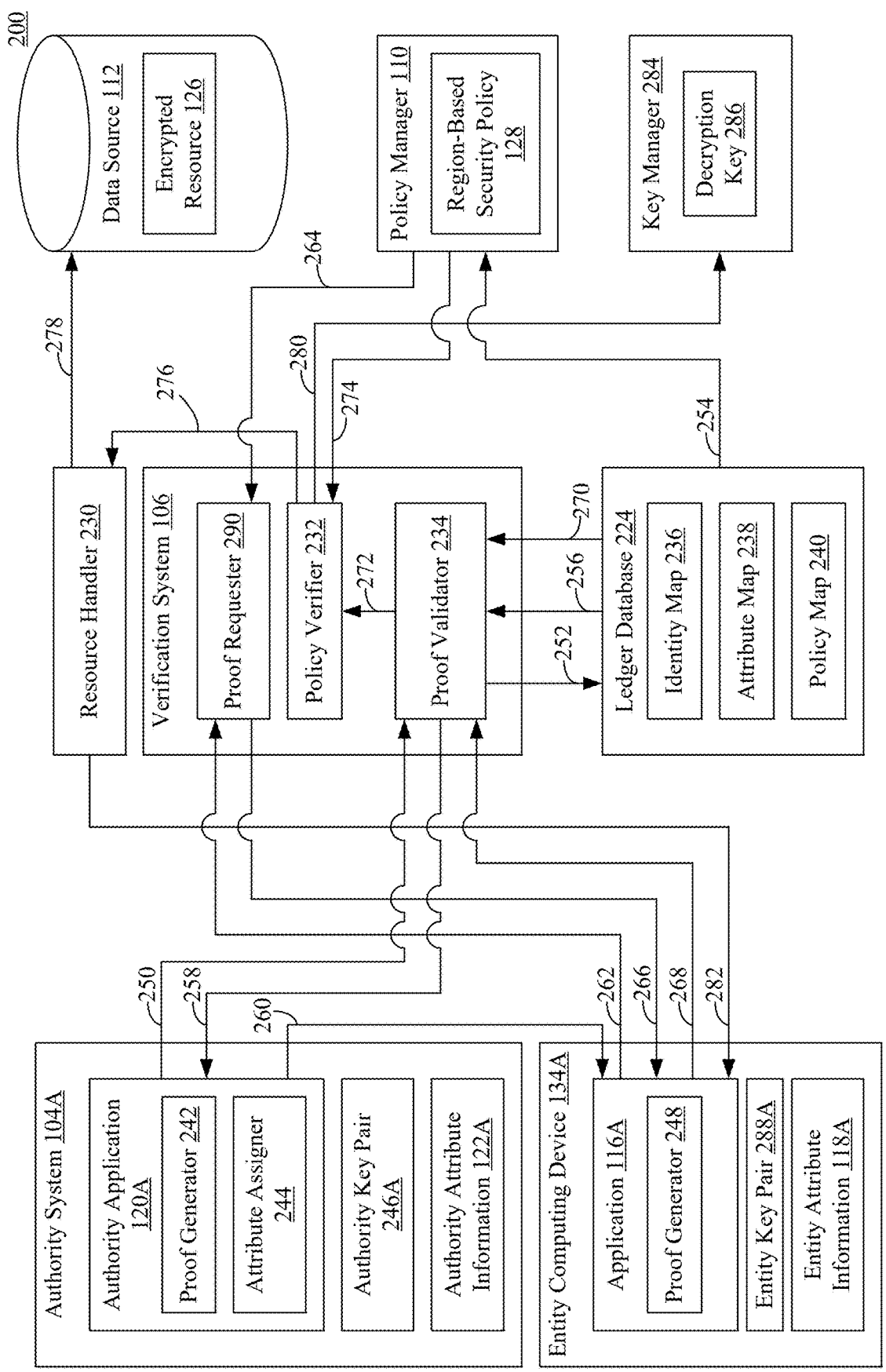
FIG. 2 shows a block diagram of a system for storing a resource protected by a region-based security policy in accordance with an example embodiment.

As noted above, authorities may set security policies for protecting resources of entities associated with a region the authority is associated with, and resources may be stored (e.g., by the authority and/or the entities) in accordance with the security policies. Systems may be configured in various ways to enable an authority to set a policy and/or enable the storage of resources in accordance with the policy. For example, FIG. 2 shows a block diagram of a system 200 for storing a resource protected by a region-based security policy in accordance with an example embodiment. System 200 includes authority system 104A, verification system 106, policy manager 110, data source 112, and entity computing device 134A, as described with respect to system 100 of FIG. 1, a ledger database 224, which is a further embodiment of ledger databases 124 of FIG. 1, a resource handler 230 (which handles access to resources and/or keys in accordance with security policies) and a key manager 284 (which stores one or more decryption keys (e.g., decryption key 286)). In accordance with an embodiment, each of resource handler 230 and key manager 284 comprise server computer(s) or computing device(s), which may include one or more distributed or "cloud-based" servers. In embodiments, resource handler 230 and/or key manager 284 comprises on-premises server(s) in addition to, or in lieu of, cloud-based servers. In accordance with an embodiment, resource handler 230 is a trusted resource handler. In accordance with another embodiment, resource handler 230 is an untrusted resource handler. In accordance with an embodiment, key manager 284 is a trusted key manager. In accordance with another embodiment, key manager 284 is an untrusted key manager. As shown in FIG. 2, ledger database 224 comprises an identity map 236, an attribute map 238, and a policy map 240. As also shown in FIG. 2, authority system 104A comprises authority application 120A and authority attribute information 122A, as described with respect to FIG. 1, and authority key pair 246A. Authority application 120A executes a proof generator 242 and an attribute assigner 244. Authority key pair 246A comprises a public key of the authority associated with authority associated with authority system 104A (e.g., Authority A) (which is known to others) and a private key of the authority (which is only known to the authority). As also shown in FIG. 2, entity computing device 134A comprises application 116A and entity attribute information 118A, as described with respect to FIG. 1, and entity key pair 288A. Application 116A executes a proof generator 248. Entity key pair 288A comprises a public key of the entity associated with entity computing device 134A (e.g., Entity A) (which is known to others) and a private key of the entity (which is only known to the entity).

As further shown in FIG. 2, verification system 106 comprises a policy verifier 232, a proof validator 234, and a proof requester 290. In accordance with one or more embodiments, resource handler 230 and/or key manager 284 are included as part of verification system 106. As shown in FIG. 2, policy verifier 232, proof validator 234 and proof requestor 290 are incorporated in verification system 106. In accordance with another embodiment, policy verifier 232, proof validator 234 and/or proof requester 290 are separate components (e.g., software applications) from verification system 106. In accordance with an embodiment, policy verifier 232, proof validator 234, and/or proof requester 290 are integrated (e.g., as a single software application). In accordance with an embodiment, policy verifier 232 is a trusted verifier. In accordance with another embodiment, policy verifier 232 is an untrusted verifier. In accordance with an embodiment, proof validator 234 is a trusted validator. In accordance with another embodiment, proof validator 234 is an untrusted validator. In accordance with an embodiment, system 200 comprises an orchestrator (not shown in FIG. 2) that facilitates communication between entities, authority systems, verification system 106, resource handler 230, data source 112, policy manager 110, and/or key manager 284. In accordance with an embodiment verification system 106 is a secure enclave. In accordance with an embodiment, verification system 106 is a secure server (e.g., a hardened or locked-down server) that is (e.g., only) loaded with applications (e.g., verification and/or decryption applications) approved by the authority of the region.

In accordance with an embodiment, verification system 106 is a location attribute policy (LAP) server (e.g., a trusted LAP server trusted by the Authority A, an untrusted LAP server, and/or the like). In this context, verification system 106 determines whether a user has the necessary attributes (e.g., region attributes) specified by a policy (e.g., security policy 128). Furthermore, a LAP server may determine if an entity possesses a static attribute and/or a dynamic attribute specified by a policy. In this context, a static attribute is an attribute that is assigned to an entity (e.g., by an authority) and is unchanged until an attribute change event occurs (e.g., an authority modifies and/or disassociates the attribute from the entity). Dynamic attributes, on the other hand, include characteristics that change more frequently than static attributes, are not assigned to a particular entity (e.g., not stored in a ledger as described herein), may be modified without the entity's direct intervention (are not changed "by hand" such as by the entity typing at a keyboard), and/or may instead be modified by a monitoring device (e.g., a change in a entity's physical location being tracked by a Global Positioning System (GPS) device). In some examples, a dynamic attribute is a characteristic that is not associated with a requesting entity, such as a requirement that a resource not be accessed more than a predetermined number of times in a given time period (e.g., a resource can be accessed only once per week by any entity).

As stated above, ledger database 224 of FIG. 2 comprises identity map 236, attribute map 238, and policy map 240. Identity map 236, attribute map 238, and policy map 240 may be generated and/or maintained by respective authorities (e.g., Authority A associated with Authority System 104A) in accordance with any technique described elsewhere herein or otherwise known for generating and or maintaining maps within a ledger database. While FIG. 2 depicts ledger database 224 storing identity map 236, attribute map 238, and policy map 240, in accordance with an alternative embodiment, separate ledger databases are used to store respective identity maps, attribute maps, and/or policy maps. An example of a database via which identity map 236, attribute map 238, and/or policy map 240 are maintained includes, but is not limited to, Azure SQL Database™ from Microsoft® Corporation of Redmond, Washington.

Identity map 236 is configured to store identities for each of a plurality of entities (e.g., citizens, residents, members, employees, organizations, agents of an authority, etc.), for example, associated with an authority. Each identity comprises information that uniquely identifies the entity associated with the authority. Examples of the identity include, but are not limited to, the entity's e-mail address, the entity's phone number, the entity's username, or any other type of information that uniquely identifies the entity. Identity map 236 is also configured to store, for each entity, a public key of the entity in association with the identity of the entity.

Attribute map 238 is configured to store one or more attributes for each of the plurality of entities associated with the authority. Each of the attribute(s) for a particular entity are stored in association with the identity of that entity. For instance, attribute map 238 is configured to store, for each entity, one or more encrypted secrets (e.g., one or more pieces of data, such as a password, a private key, a public key, a string of characters and/or random numbers, etc. that are encoded in accordance with an encryption technique, such as, but not limited to, a secure hash algorithm (SHA)-based technique). Each of the secret(s) for a particular entity are stored in association with the identity of that entity. For instance, the secret(s) for a particular entity in accordance with an embodiment are associated with a reference of to an identity of the particular entity. Examples of references to identities include, but are not limited to, identities, copies of identities maintained external to attribute map 238 (e.g., in identity map 236), and/or a link to an identity maintained external to attribute map 238. Attribute map 238 also associates each encrypted secret with a corresponding attribute of the attributes stored in attribute map 238. As described elsewhere herein, the encrypted secrets are utilized to verify whether an entity is actually associated with corresponding attributes (e.g., to verify whether an entity possesses the corresponding attributes). In accordance with an embodiment, the secret(s) of an entity stored in attribute map 238 are encrypted with a public key of that entity. In accordance with an embodiment, attribute map 238 is also configured to store, for each attribute, a public key, which, as described with reference to proof generator 242, proof generator 248, and proof validator 234, is utilized to generate and verify cryptographic proofs. In this context, attribute map 238 associates each public key with a corresponding attribute and corresponding encrypted secret share of the attributes stored in attribute map 238.

Policy map 240 is configured to store one or more policies ("policies" hereinafter) for resources maintained by data source 112. For example, policy map 240 stores policy information related to security policy 128 managed by policy manager 110. Each of the policies specify one or more conditions that are required to be satisfied for an entity to perform a certain action with respect to a corresponding resource. Such actions include, but are not limited to, accessing the resource (e.g., reading the resource, obtaining the resource, or modifying the resource), sending the resource to another entity, sending a communication associated with the resource to another entity, storing the resource, etc. The conditions include, but are not limited to, a particular region the entity (and/or a computing device associated therewith) is required to be associated with, a particular region the entity (and/or computing device associated therewith) is required to be located in, particular secrets required to perform the action, a particular identity of a particular entity authorized to perform the action, particular attributes that the identity (or entity) is required to have to perform the action, a location at which the entity (and/or a computing device associated therewith) is required to be to perform the action, and/or the like. Examples of regions include, but are not limited to, a particular city, a particular county, a particular state, a particular province, a particular country, a particular group of one or more cities, counties, states, provinces, and/or countries, and/or any other region in which an entity would be associated with. Examples of locations include, but are not limited to, a particular room or building, a particular vehicle or vessel (e.g., a particular car, a particular submarine, a particular aircraft carrier, etc.), a particular region, etc. Policy map 240 associates each policy with a policy ID, which uniquely identifies a corresponding policy (e.g., security policy 128). In accordance with an embodiment, policy map 240 also associates each policy ID with an authority ID, which uniquely identifies an authority authorized to modify and/or otherwise manage the corresponding policy (e.g., Authority A of authority system 104A). In accordance with an embodiment, policy map 240 associates each policy ID with one or more attributes (or corresponding secrets) required to satisfy the policy. For instance, in accordance with an embodiment, security policy 128 requires an entity to possess an attribute indicating the entity is associated with Region A and policy map 240 associates a policy ID of security policy 128 to the secret corresponding to the attribute.

Figure 3A:
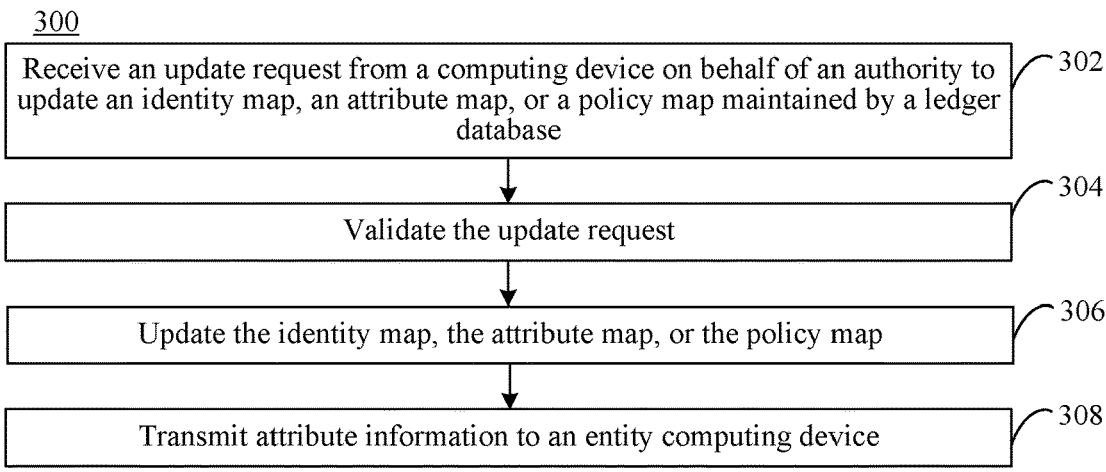
FIG. 3A shows a flowchart of a process for updating a map maintained by a ledger database in accordance with an embodiment.

As noted above, systems enable authorities to set region-based security policies for protecting resources. For instance, a system may enable an authority (or a user and/or service acting on behalf of the authority) to update a ledger database with respect to a region-based security policy. For example, FIG. 3A shows a flowchart 300 of a process for updating a map maintained by a ledger database in accordance with an example embodiment. System 200 may operate according to flowchart 300 in embodiments. Not all steps of flowchart 300 need be performed in all embodiments. Further structural and operational embodiments will be apparent to persons skilled in the relevant art(s) based on the following descriptions of FIGS. 2 and 3A.

Flowchart 300 begins with step 302. In step 302, an update request is received from a computing device on behalf of an authority to update an identity map, an attribute map, or a policy map maintained by a ledger database. For instance, proof validator 234 receives an update request 250 from authority application 120A (e.g., executing on a computing device of authority system 104A) on behalf of Authority A to update identity map 236, attribute map 238, and/or policy map 240. In this context, identity map 236, attribute map 238, and policy map 240 are maps of ledger database 224 managed and/or maintained by Authority A. In accordance with an embodiment, update request 250 comprises a proof of an authority attribute that indicates Authority A is authorized to update identity map 236, attribute map 238, and/or policy map 240. In accordance with an embodiment, update request 250 comprises a digest corresponding to ledger database 224, identity map 236, attribute map 238, and/or policy map 240. In embodiments, update request 250 includes a request to add information, remove information, change information, and/or otherwise modify information stored in identity map 236, attribute map 238, and/or policy map 240. In some embodiments, update request 250 includes a request to generate or remove identity map 236, attribute map 238, policy map 240, and/or another map not shown in FIG. 2. In embodiments, update request 250 includes information to be added or changed in the respective map (e.g., identities of users, attribute information, policy information, etc.).

In a non-limiting running example, Authority A is a government of Region A. In this example, identity map 236 maps identities of citizens and residents of Region A to respective public keys of the citizens and residents of Region A, attribute map 238 maps identities of citizens and residents of Region A to respective attributes of the citizens and residents of Region A, and policy map 240 maps security and access policies set by Authority A to identities of citizens and residents of Region A and data stored on behalf of citizens and residents of Region A. In accordance with an embodiment, attribute map 238 maps identities of citizens and residents of Region A to respective secrets that correspond to the respective attributes. Attribute assigner 244 (on behalf of Authority A) assigns "citizen of Region A" attributes to citizen user entities, assigns "resident of Region A" attributes to resident user entities, and assigns "authority of Region A" to authority entities (and/or to user entities that operate on behalf of authorities). For instance, attribute assigner 244 assigns a secret corresponding to a "citizen of Region A" attribute ("Secret A1") to a first citizen of Region A associated with entity computing device 134A ("Entity A"). In this example, Authority A (e.g., via authority application 120A) transmits update request 250 to update identity map 236 to include an identifier of Entity A, to update attribute map 238 to map the identifier of Entity A to an encrypted version of Secret A1, and to update policy map 240 to map a policy identifier of security policy 128 to the identifier of Entity A. In this example, security policy 128 requires entities requesting access and/or storage of private data to prove the requesting entity is a citizen of Region A (e.g., prove possession of Secret A1), a resident of Region A (e.g., prove possession of a secret corresponding to a "resident of Region A" attribute ("Secret A2")), and/or an authority of Region A (e.g., prove possession of a secret corresponding to an "authority of Region A" attribute ("Secret A3")).

As stated above, update request 250 may comprise a proof of an authority attribute (e.g., of authority attribute information 122A). For example, proof generator 242 is configured to generate a zero-knowledge cryptographic proof based at least on an unencrypted version of the authority attribute. In accordance with an embodiment, proof generator 248 is configured to generate a zero-knowledge cryptographic proof based at least on an unencrypted version of a secret that corresponds to the attribute (e.g., Secret A3). In accordance with an embodiment, proof generator 242 is incorporated in authority application 120A (as shown in FIG. 2). In accordance with another embodiment, proof generator 242 is a separate component (e.g., a software application, a hardware-based proof generator, etc.) from application 120A.

In accordance with an embodiment, and with reference to the running example, proof generator 242 of FIG. 2 is configured to generate the zero-knowledge cryptographic proof of attribute based at least on Secret A3, a public key of Authority A, and an encryption algorithm used to encrypt a set of data. In accordance with an embodiment, proof generator 242 generates the cryptographic proof based on a zero-knowledge protocol, such as, but not limited to, Schnorr's protocol. In examples, while proof generator 242 generates a value using the unencrypted version of Secret A3 (which is deemed private), the generated value does not include the unencrypted secret. In other words, the generated value of the cryptographic proof cannot be used to reconstruct any unencrypted secret. In this manner, proof generator 242 provides a proof that proves that Authority A possesses a given attribute (or secret corresponding to the attribute), despite not relaying the attribute or secret.

In various embodiments, the (zero-knowledge) proof of the authority attribute (also referred to as the "authority proof") comprises information that is used to prove that the authority (e.g., Authority A) possesses the value of an attribute or corresponding secret (e.g., Secret A3), and that if that value is inputted into an encryption algorithm, then the value of an encrypted version of Secret A3 (e.g., stored in attribute map 238) will be obtained. In various other embodiments, other algorithms are used, such as a secure hash algorithm (SHA) instead of an encryption algorithm. For instance, with respect to the running example, the zero knowledge proof in such a case would be used to prove that if the value of Secret A3 is inputted into a SHA, the value of the encrypted version of Secret A3 stored in attribute map 238 will be obtained (provided that the value in attribute map 238 is also based on this algorithm). Other techniques are also contemplated herein, and disclosed techniques for providing a zero-knowledge proof are not limited to these illustrative examples. In some further implementations, the zero-knowledge proof is not re-playable. For example, in some embodiments, proof validator 234 generates a random number for each session (e.g., each new communication session in which authority system 104A seeks to access encrypted resources and/or update an identity map, an attribute map, and/or policy map), and provides the randomly generated number to proof generator 242 to be used as part of the proof generation process. Thus, even if the same proof was attempted to be used for a subsequent session (either by the same computing device or in a malicious fashion by a different system), the proof would not succeed because the subsequent session would have a different randomly generated number that is to be used as part of the proof generation process.

In step 304, the update request is validated. For instance, proof validator 234 validates update request 250. Proof validator 234 validates update request 250 in a similar manner to validating storage requests and/or resource requests, as described elsewhere herein. For example, proof validator 234 may validate update request 250 based on the authority proof included in update request 250 and/or a digest included in update request 250 (Additional details regarding digests are described with respect to FIG. 6). Alternatively, proof validator 234 requests (e.g., by transmitting a prompt, not shown in FIG. 2) authority application 120A provides the authority proof and/or a digest for validation of update request 250. Furthermore, proof validator 234 in accordance with one or more embodiments obtains an encrypted version of the attribute (or corresponding secret) from an attribute map that maps an identity of the authority to the authority attribute (or corresponding secret). For example, in reference to the non-limiting running example, update request 250 includes an identity of Authority A and a proof of Secret A3 generated by proof generator 242. In this example, proof validator 234 obtains an encrypted version of Secret A3 from attribute map 238 based on the identity of Authority A included in update request 250. Proof validator 234 determines if the proof of Secret A3 corresponds to the encrypted version of Secret A3. For instance, suppose proof validator 234 determines if the proof of the attribute corresponds to the encrypted attribute based at least on two or more of the proof, the encrypted attribute, and a public key corresponding to the encrypted attribute. Alternatively, suppose proof validator 234 validates the proof based on a zero-knowledge protocol, such as, but not limited to, Schnorr's protocol. In one implementation, validation of the proof is performed by comparing a first value generated by proof validator 234 that is determined from the encrypted version of Secret A3 obtained from attribute map 238 and the public key corresponding to Authority A obtained from identity map 236 with a second value that is based on the proof of Secret A3. In response to determining that the proof corresponds to the encrypted attribute, proof validator 234 validates update request 250 and flowchart 300 continues to step 306.

In accordance with an embodiment, if the request is not validated, proof validator 234 transmits an indication to authority application 120A that indicates update request 250 is invalid. Alternatively, proof validator 234 transmits the indication to another computing device of authority system 104A (e.g., a computing device of an admin user, a computing device of a service team user, a computing device of a security team user, and/or the like).

In step 306, the identity map, the attribute map, or the policy map is updated. For example, proof validator 234 provides an update signal 252 to ledger database 224 to update identity map 236, attribute map 238, and/or policy map 240. Update signal 252 indicates the requested update of update request 250. In accordance with an embodiment, update signal 252 includes information to be added and/or changed in a respective map included in update request 250. Referring again to the non-limiting running example, proof validator 234 provides update signal 252 to ledger database 224 to cause ledger database 224 to update identity map 236 to include the identifier of Entity A, to update attribute map 238 to map the identifier of Entity A to the "citizen of Region A" attribute (e.g., by mapping the identifier of Entity A to Secret A1), and to update policy map 240 to map the policy identifier of security policy 128 to the identifier of Entity A.

In accordance with an embodiment, a policy manager is notified if a policy map stored by ledger database 224 is changed. For example, as shown in FIG. 2, ledger database 224 transmits a notification 254 to policy manager 110. Notification 254 indicates updates to security policies corresponding to policy map 240 and managed by policy manager 110 (e.g., security policy 128). For instance, suppose update request 250 includes a request to apply a new security policy (e.g., security policy 128) to resources stored by a cloud service provider on behalf of citizens and residents of Region A. In this context, ledger database 224 updates policy map 240 to map an identifier of security policy 128 to a citizen of Region A attribute and a resident of Region A attribute, or corresponding secrets (e.g., Secret A1 and Secret A2); thereby setting security policy 128 to require an entity to possess Secret A1 and/or Secret A2 (or proof thereof) in order to access resources protected by the policy. Ledger database 224 transmits notification 254 to policy manager 110, and policy manager 110 updates security policy 128 to indicate the change in security policies.

In accordance with an embodiment, and as shown in FIG. 2, authority system 104 is notified that identity map 236, attribute map 238, and/or policy map 240 is successfully updated. For instance, as shown in FIG. 2, ledger database 224 generates a notification 256 that indicates the respective map was updated in response to update signal 252. Proof validator 234 receives notification 256 and provides a notification 258 to authority application 120A indicating that update request 250 has been fulfilled.

In step 308, attribute information is transmitted to an entity computing device. For instance, authority application 120A transmits attribute information 260 to application 116A of entity computing device 134A. Attribute information 260 includes indication of attributes assigned to the entity corresponding to entity computing device 134A (e.g., "Entity A") by Authority A. For instance, with reference to the running example, attribute information 260 includes an indication that Secret A1 was assigned to Entity A. In accordance with an embodiment, authority application 120A encrypts attribute information 260 using a public key (e.g., of entity key pair 288A) of the entity corresponding to entity computing device 134A (e.g., Entity A). In accordance with an embodiment, authority application 120A obtains the public key from identity map 236 using an identifier of the entity. By encrypting attribute information 260 in this manner, authority application 120A is able to securely transmit attribute information 260 to entity computing device 134A (e.g., in a manner that only a user possessing the private key of entity key pair 288A is able to decrypt attribute information 260). In accordance with an embodiment, authority application 120A signs the attribute information 260 using a private signing key of authority key pair 246A. By signing attribute information 260 in this manner, application 116A is able to verify attribute information 260 is received from Authority A (e.g., using a public signing key of authority key pair 246A).

For instance, referring to the non-limiting running example, authority application 120A obtains a public key of entity key pair 288A from identity map 236, encrypts Secret A3 using the public key, and signs the encrypted version of Secret A3 using a private signing key of authority key pair 246A to generate attribute information 260. Authority application 120A transmits attribute information 260 to application 116A. Application 116A obtains a public signing key of authority key pair 246A from identity map 236 and verifies the signature of attribute information 260. In accordance with an embodiment, application 116A stores attribute information 260 in a local storage of entity computing device 134A (e.g., as entity attribute information 118A). Alternatively, application 116A stores attribute information 260 in an external storage accessible to entity computing device 134A. In accordance with an embodiment, application 116A decrypts the received attribute information 260 (e.g., using a private decryption key of entity key pair 288A).

Figure 3B:
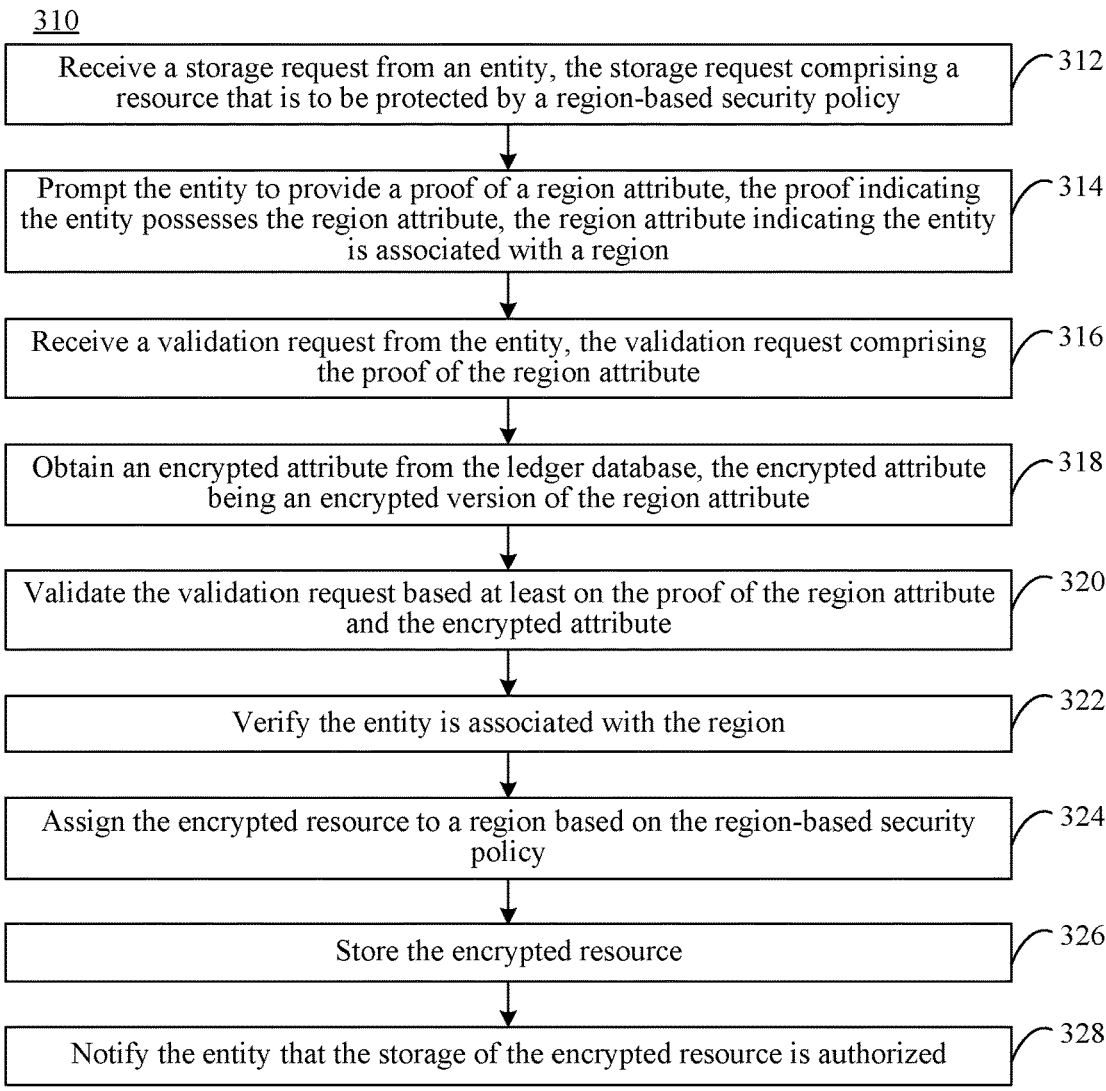
FIG. 3B shows a flowchart of a process for storing a resource protected by a region-based security policy in accordance with an example embodiment.

As noted above, systems enable authorities and/or entities to store resources in a manner that protects the resource in accordance with a region-based security policy. For instance, in some embodiments, an entity (or a user, an authority, and/or a service acting on behalf of the entity) stores a resource in a data source by encrypting the resource with an encryption key of a region-based security policy. In this context, a corresponding decryption key is released to an entity requesting access to the resource upon the entity presenting proof of attributes that satisfy the region-based security policy. Alternatively, a system may verify whether resources of an entity are to be protected by a particular region-based security policy before encrypting and storing the resource. For example, FIG. 3B shows a flowchart 310 of a process for storing a resource protected by a region-based security policy in accordance with an example embodiment. System 200 may operate according to flowchart 300 in embodiments. Not all steps of flowchart 310 need be performed in all embodiments. Further structural and operational embodiments will be apparent to persons skilled in the relevant art(s) based on the following descriptions of FIGS. 2 and 3B.

Flowchart 310 begins with step 312. In step 312, a storage request is received from an entity, the storage request comprising a resource protected by a region-based security policy. For example, proof requester 290 of FIG. 2 receives a storage request 262 from application 116A (e.g., on behalf of Entity A). Storage request 262 includes a resource (e.g., to be) protected by security policy 128. The resource may be encrypted (e.g., using an encryption key) in a manner that a user possessing an appropriate decryption key (e.g., a decryption key corresponding to the encryption key (e.g., decryption key 286)) is able to decrypt and access the resource. For instance, in accordance with an embodiment, the resource is encrypted with a policy encryption key of security policy 128 (e.g., that corresponds to a decryption key of security policy 128 (e.g., decryption key 286) that is released when a requesting entity satisfies access criteria of security policy 128). In accordance with another embodiment, the resource is encrypted with a data encryption key that corresponds to a data decryption key, the data decryption key encrypted by one or more policy keys (each corresponding to a respective security policy) in a manner that enables access to the data decryption key once (e.g., all) access criteria of each of the one or more policies is met. With reference to the non-limiting running example, proof requester 290 receives storage request 262 from application 120 on behalf of Entity A. In this context, storage request 262 comprises a resource (e.g., private data) that Entity A wants to store and protect under security policy 128 (e.g., the region-based security policy set by Authority A).

In accordance with an embodiment, and with reference to the non-limiting running example, storage request 262 includes (e.g., an encrypted version of) a decryption key (e.g., of security policy 128 (e.g., decryption key 286)). Alternatively, the resource included in storage request 262 is encrypted with an encryption key corresponding to the decryption key. In accordance with an embodiment, key manager 284 is a secure key manager and the decryption key is encrypted with a public key of a key pair of key manager 284 (not shown in FIG. 2). In this context, the encrypted version of the decryption key may be provided to verification system 106 without enabling verification system 106 (or a component thereof) (or a malicious entity that comprises verification system 106) to access the decryption key, and thereby decrypt and access the encrypted resource. In accordance with another embodiment, the decryption key is encrypted with a public key of a secure resource handler (e.g., resource handler 230). In this context, the encrypted version of the decryption key may be provided to and stored by the cloud service provider without enabling the cloud service provider (or a malicious entity that compromises the cloud service provider) to access the decryption key, and thereby decrypt and access the encrypted resource.

In step 314, the entity is prompted to provide a proof of a region attribute, the proof indicating the entity possesses the region attribute. For instance, proof requester 290 of FIG. 2 transmits a proof request 266 to application 116A to prompt Entity A to provide a proof of a region attribute (e.g., via application 116A) (e.g., to authorize storing the resource included in storage request 262). Proof requester 290 may determine to transmit proof request 266 in various ways. For example, as shown in FIG. 2 proof requester 290 obtains policy information 264 (e.g., policy information corresponding to security policy 128) from policy manager 210, analyzes policy information 264 to determine requirements of security policy 128 to access resources protected by security policy 128. For instance, security policy 128 in accordance with an embodiment requires entities to prove they are a citizen of Region A, a resident of Region A, or an authority of Region A in order to store and/or access private data protected by security policy 128. In this context, proof requester 290 transmits proof request 266 to prompt the entity to prove that the entity possesses an attribute (or corresponding secret) indicating the entity is a citizen of Region A, a resident of Region A, or an authority of Region A. For instance, in the non-limiting running example, proof requester 290 determines that security policy 128 is a region-based security policy of Region A that requires Entity A to prove they possess Secret A1 (indicating the entity is assigned the "citizen of Region A" attribute), Secret A2 (indicating the entity is assigned the "resident of Region A" attribute), or Secret A3 (indicating the entity is assigned the "authority of Region A" attribute). Alternatively, security policy 128 requires Entity A to prove they possess a Secret A4 that indicates the entity is associated with Region A (e.g., either a citizen of Region A, a resident of Region A, an authority of Region A, or otherwise associated with Region A in a manner that satisfies security policy 128). In either case, proof requester 290 transmits proof request 266 to application 116A to prompt Entity A to provide a corresponding proof of a region attribute.

As mentioned above, proof request 266 prompts an entity (or an application on behalf of the entity) to provide a proof of a region attribute to authorize storing of a resource protected by a security policy. For example, proof generator 248 is configured to generate a zero-knowledge cryptographic proof based at least on an unencrypted version of a region attribute. In accordance with an embodiment, proof generator 248 is configured to generate a zero-knowledge cryptographic proof based at least on an unencrypted version of a secret that corresponds to the region attribute (e.g., Secret A1). In accordance with an embodiment, proof generator 248 is incorporated in application 116A (as shown in FIG. 2). In accordance with another embodiment, proof generator 248 is a separate component (e.g., a software application, a hardware-based proof generator, etc.) from application 116A.

In accordance with an embodiment, and with reference to the running example, proof generator 248 of FIG. 2 is configured to generate the zero-knowledge cryptographic proof of the region attribute based at least on an unencrypted version of Secret A1, a public key of Entity A, and an encryption algorithm used to encrypt a set of data. In accordance with an embodiment, proof generator 248 generates the cryptographic proof based on a zero-knowledge protocol, such as, but not limited to, Schnorr's protocol. In examples, while proof generator 248 generates a value using the unencrypted version of Secret A1 (which is deemed private), the generated value does not include the unencrypted secret. In other words, the generated value of the cryptographic proof cannot be used to reconstruct any unencrypted secret. In this manner, proof generator 248 provides a proof that proves that Entity A possesses a given region attribute (or secret corresponding to the region attribute), despite not relaying the region attribute or secret.

In various embodiments, the (zero-knowledge) proof of the region attribute (also referred to as the "attribute proof") comprises information that is used to prove that the entity (e.g., Entity A) possesses the value of a region attribute or corresponding secret (e.g., Secret A1), and that if that value is inputted into an encryption algorithm, then the value of an encrypted version of Secret A1 (e.g., stored in attribute map 238) will be obtained. In various other embodiments, other algorithms are used, such as a secure hash algorithm (SHA) instead of an encryption algorithm. For instance, with respect to the running example, the zero knowledge proof in such a case would be used to prove that if the value of Secret A1 is inputted into a SHA, the value of the encrypted version of Secret A1 stored in attribute map 238 will be obtained (provided that the value in attribute map 238 is also based on this algorithm). Other techniques are also contemplated herein, and disclosed techniques for providing a zero-knowledge proof are not limited to these illustrative examples. In some further implementations, the zero-knowledge proof is not re-playable. For example, in some embodiments, proof validator 234 generates a random number for each session (e.g., each new communication session in which entity computing device 134A seeks to store encrypted resources in protection under security policy 128), and provides the randomly generated number to proof generator 248 to be used as part of the proof generation process. Thus, even if the same proof was attempted to be used for a subsequent session (either by the same computing device or in a malicious fashion by a different system), the proof would not succeed because the subsequent session would have a different randomly generated number that is to be used as part of the proof generation process.

In step 316, a validation request is received from the entity, the validation request comprising the proof of the attribute. For instance, proof validator 234 of FIG. 2 receives a validation request 268 comprising the proof of the (e.g., requested) region attribute (or corresponding secret) from application 116A. Validation request 268 comprises the (zero knowledge cryptographic) attribute proof generated using proof generator 248, as described above. In accordance with an embodiment, validation request includes an entity identifier (ID) (e.g., Entity A in the running example).

In step 318, encrypted attribute information is obtained from a ledger database. The encrypted attribute information comprises an encrypted version of the attribute. For instance, proof validator 234 of FIG. 2 obtains encrypted attribute information comprising an encrypted version of the region attribute (or corresponding secret) from attribute map 238 via signal 270. In accordance with an embodiment, signal 270 also includes a public key obtained from identity map 236. Proof validator 234 obtains encrypted attribute information (e.g., an encrypted version of a region attribute, an encrypted version of a secret corresponding to the region attribute (e.g., Secret A1), and/or the like) from attribute map 238 based on an entity ID that uniquely identifies the entity associated with validation request 268. The entity ID may be included in validation request 268 and/or storage request 262. Proof validator 234 accesses attribute map 238 based on the entity ID and obtains corresponding encrypted attribute information associated with the entity ID. For instance, in the running example, proof validator 234 accesses attribute map 238 to obtain an encrypted version of Secret A1 associated with an entity ID of Entity A. Additional details regarding obtaining encrypted versions of attribute information from attribute maps are discussed with respect to FIG. 6, as well as elsewhere herein.

In step 320, the validation request is validated based at least on the proof of the region attribute and the encrypted attribute information. For instance, proof validator 234 of FIG. 2 validates validation request 268 based at least on the attribute proof included in validation request 268 and the encrypted attribute information obtained via signal 270. In accordance with an embodiment, validation request 268 is validated without decrypting the encrypted attribute information (e.g., encrypted versions of region attributes, encrypted secrets (e.g., the encrypted version of Secret A1), etc.). In accordance with an embodiment and in reference to the running example, proof validator 234 determines if the proof of the region attribute received in validation request 268 corresponds to an encrypted version of Secret A1. In accordance with an embodiment, proof validator 234 determines if the received proof corresponds to the encrypted version of Secret A1 based at least on two or more of the received proof, the encrypted version of Secret A1, and a public key corresponding to the encrypted attribute information (e.g., a public key of entity key pair 288A or a public key of authority key pair 246A). In accordance with an embodiment, proof validator 234 validates the respective proof based on a zero-knowledge protocol, such as, but not limited to, Schnorr's protocol. If proof validator 234 validates validation request 268, proof validator 234 generates indication 272, indicating the request is valid (e.g., the proof of the region attribute indicates Entity A possesses Secret A1), and flowchart 300 continues to step 322.

In response to determining that the proof does not correspond to the encrypted attribute information, proof validator 234 does not validate validation request 268. In accordance with an embodiment, in response to not validating validation request 268, proof validator 234 invalidates validation request 268. In accordance with an embodiment, in response to not validating validation request 268, proof validator 234 transmits a notification (not shown in FIG. 2) to application 116A or to Entity A (e.g., to another application or computing device associated with Entity A) indicating that validation request 268 was not validated. In accordance with an embodiment, proof validator 234 transmits a notification (not shown in FIG. 2) to authority application 120A or to Authority A (e.g., to another application of authority system 104A, to another computing device of authority system 104A, or to another system associated with Authority A) indicating that validation request 268 was not validated. In either case, such notification may indicate the entity associated with validation request 268 (and/or storage request 262), the policy associated with the storage/validation request (e.g., security policy 128), and/or any other information associated with either the validation or the storage request.

In step 322, a verification that the entity is associated with the region is made. For instance, policy verifier 232 receives indication 272 from proof validator 234 and verifies that Entity A is associated with Region A. Policy verifier 232 in accordance with an embodiment verifies that the entity is associated with the region in order to determine if storage criteria of security policy 128 is met. For instance, policy verifier 232 obtains policy information 274 from policy manager 110. Policy information 274 includes storage criteria of security policy 128 (e.g., a requirement that the entity is a citizen of Region A, a resident of Region A, or an authority of Region A). Policy verifier 232 analyzes policy information 274 and indication 272 to determine (e.g., verify) that storage criteria of security policy 128 is met. For instance, in the running example, policy verifier 232 analyzes policy information 274 to determine that Entity A should possess Secret A1, Secret A2, and/or Secret A3 in order to protect Entity A's encrypted resource with security policy 128. Policy verifier 232 also analyzes indication 272 to determine that (based on the validation made by proof validator 234) Entity A possesses Secret A1. Based on the analysis of policy information 274 and indication 272, policy verifier 232 verifies that Entity A is associated with Region A (and the storage criteria of security policy 128 is met) and generates indication 276 indicating that Entity A is associated with Region A and flowchart 300 proceeds to step 324.

In step 324, the encrypted resource is assigned to a region based on the region-based security policy. For example, resource handler 230 of FIG. 2 assigns the (e.g., encrypted) resource protected by security policy 128 to a region based on security policy 128. For instance, continuing the running example, resource handler 230 assigns Entity A's resource included in storage request 262 to Region A. In accordance with an embodiment, resource handler 230 assigns the resource to the region by encryption the resource using an encryption key of security policy 128. In this context, the attribute requirement(s) to access a corresponding decryption key (e.g., decryption key 286) to access the encrypted resource are associated with a policy ID of security policy 128 in policy map 240 In this manner, verification system 106 (or a component thereof (e.g., proof validator 234, policy verifier 232, resource handler 230)), entities (or applications and/or computing devices on behalf of the entities), authorities (or applications and/or systems on behalf of the authorities), and/or other components, users, entities, and/or applications may access policy map 240 to determine access criteria (e.g., the attributes required to access) of the resource protected by security policy 128.

In step 326, the encrypted resource is stored. For instance, resource handler 230 of FIG. 2 transmits a storage signal 278 to data source 112 for storing the (e.g., encrypted) resource protected by security policy 128 (e.g., as encrypted resource 126). Storage signal 278 comprises the resource. In accordance with an embodiment, storage signal 278 also includes an indication of the policy that protects encrypted resource 126 (e.g., a policy identifier (ID) of security policy 128). Alternatively, storage signal 278 includes a resource identifier that uniquely identifies encrypted resource 126. In this context, data source 112 stores encrypted resource 126 with the associated resource identifier. Additional details regarding authorizing access to resources protected by security policies based on policy maps are discussed with respect to FIGS. 4, 5, 7, and 8, as well as elsewhere herein.

In step 328, the entity is notified that the storage of the encrypted resource is authorized. For example, resource handler 230 transmits a successful storage notification 282 ("notification 282" herein) to application 116A, as shown in FIG. 2. Examples of notification 282 include, but are not limited to, a short messaging service (SMS) message, a telephone call, an e-mail, a notification that is presented via application 116A and/or another application executing on entity computing device 134A and/or another computing device associated with the entity, etc. Alternatively, resource handler 230 transmits notification 282 to another computing device (e.g., a personal computing device) associated with the entity.

In the above example, resource handler 230 is described as encrypting a resource in response to indication 276. Alternatively, policy verifier 232 (or another component of verification system 106) encrypts the resource (e.g., using an encryption key of security policy 128) and provides the encrypted resource to resource handler 230 in indication 276. In a further alternative embodiment, policy verifier 232 (or another component of verification system 106) stores the encrypted resource in data source 112 (e.g., without transmitting an indication to resource handler 230).

In some embodiments, and as shown in FIG. 2, policy verifier 232 provides an (e.g., encrypted) decryption key to key manager 284. For example, policy verifier 232 provides an encrypted decryption key to key manager 284 via key store request 280, as shown in FIG. 2. Key manager 284 stores the encrypted decryption key (e.g., an encrypted version of a decryption key corresponding to the encryption key of security policy 128) included in key storage request 280 as decryption key 286. In accordance with an embodiment, key manager 284 includes a policy identifier with decryption key 286 that uniquely identifies the policy associated with decryption key 286 (e.g., security policy 128). Alternatively, policy map 240 associates the policy ID of security policy 128 to a key identifier that uniquely identifies decryption key 286.

IV. Example Embodiments for Providing Access to Resources

Figure 4:
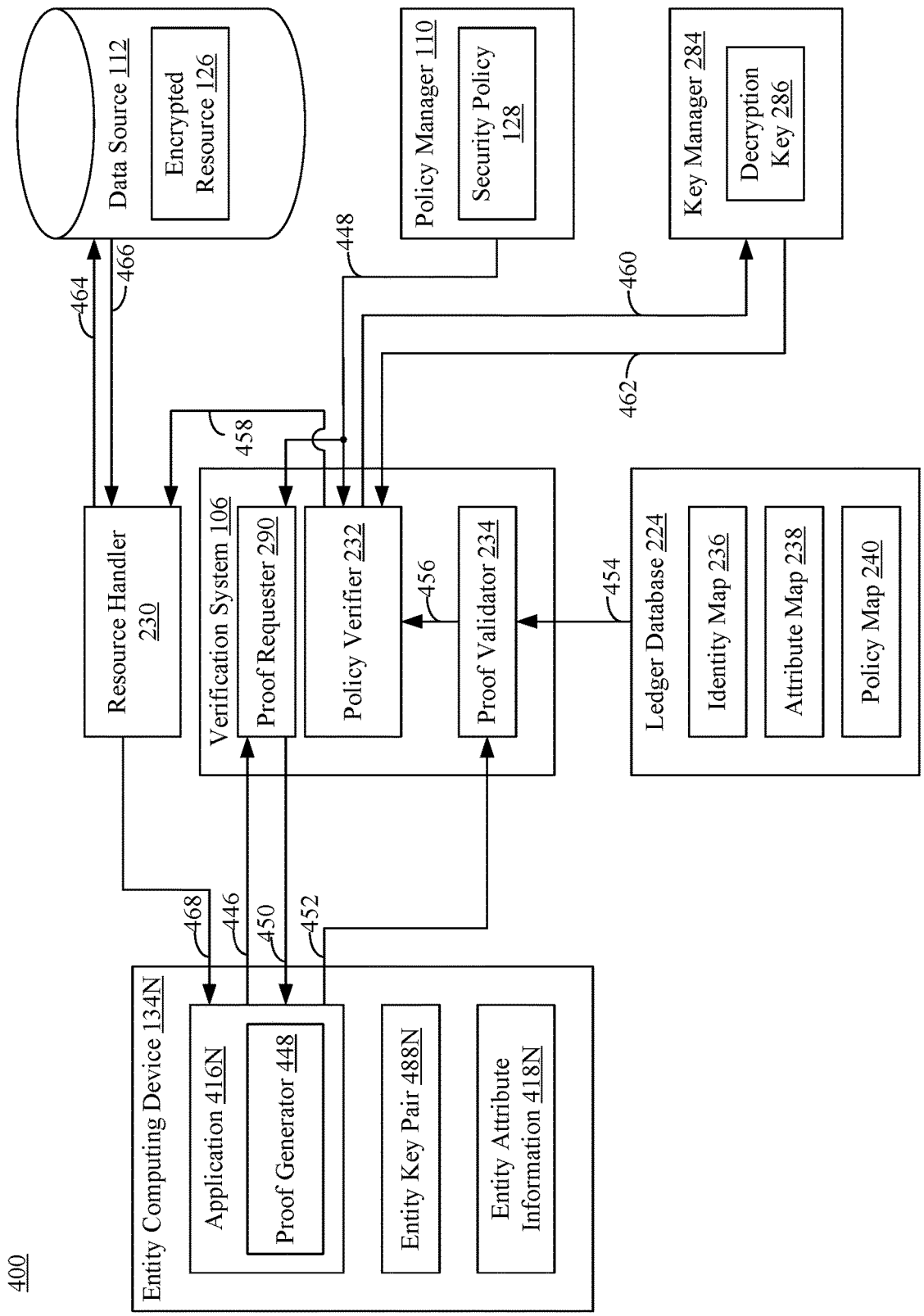
FIG. 4 shows a block diagram of a system for providing access to a resource protected by a region-based security policy in accordance with an embodiment.

As described herein, embodiments provide an entity access to a resource protected by a region-based security policy. Systems, methods, and computer-readable storage medium having program instructions recorded thereon may provide access to resources protected by region-based security policies in various ways, in embodiments. For example, FIG. 4 shows a block diagram of a system 400 for providing access to a resource protected by a region-based security policy in accordance with an embodiment. As shown in FIG. 4, system 400 includes entity computing device 134N, as described above with respect to FIG. 1, verification system 106 (comprising policy verifier 232, proof validator 234, and proof requester 290), policy manager 110 (storing security policy 128), data source 112 (maintaining encrypted resource 126), ledger database 224 (comprising identity map 236, attribute map 238, and policy map 240), resource handler 230, and key manager 284 (maintaining decryption key 286), as described above with respect to FIG. 2. As also shown in FIG. 4, entity computing device 134N comprises an application 416N, entity key pair 488N, and attribute information 418N. Application 416N is any software application that is utilized to access resources (e.g., resources maintained by data source 112), encrypt resources (e.g., to generate encrypted resource 126), generate proofs of attributes (e.g., of entity attribute information 418N), access ledger databases (e.g., ledger databases 224), interface with an associated authority system (e.g., authority system 104A), interface with verification system 106, interface with resource handler 230, and/or otherwise interact with other computing devices, services, and/or components of system 400. Examples of application 416N include, but are not limited to, a messaging application (e.g., Microsoft Teams™ published by Microsoft Corporation of Redmond, WA), a word processing application (e.g., Microsoft Word™ published by Microsoft Corporation), a database application, etc. As shown in FIG. 4, application 416N executes a proof generator 448. Entity key pair 488N comprises a public key of the entity associated with entity computing device 134N (e.g., "Entity N") (which is known to others) and a private key of the entity (which is only known to the entity). Entity attribute information 418N includes information that proves the entity associated with entity computing device 134N (e.g., Entity N) possesses one or more attributes. For instance, continuing the non-limiting example discussed with respect to FIGS. 2 and 3, suppose Entity N is an employee user operating on behalf of an organization that conducts business in Region A. In this context, Entity N is a resident of Region A and possesses Secret A2. In accordance with an embodiment, system 400 comprises an orchestrator (not shown in FIG. 4) that facilitates communication between entities, authority systems, verification system 106, resource handler 230, data source 112, policy manager 110, and/or key manager 284.

Figure 5A:
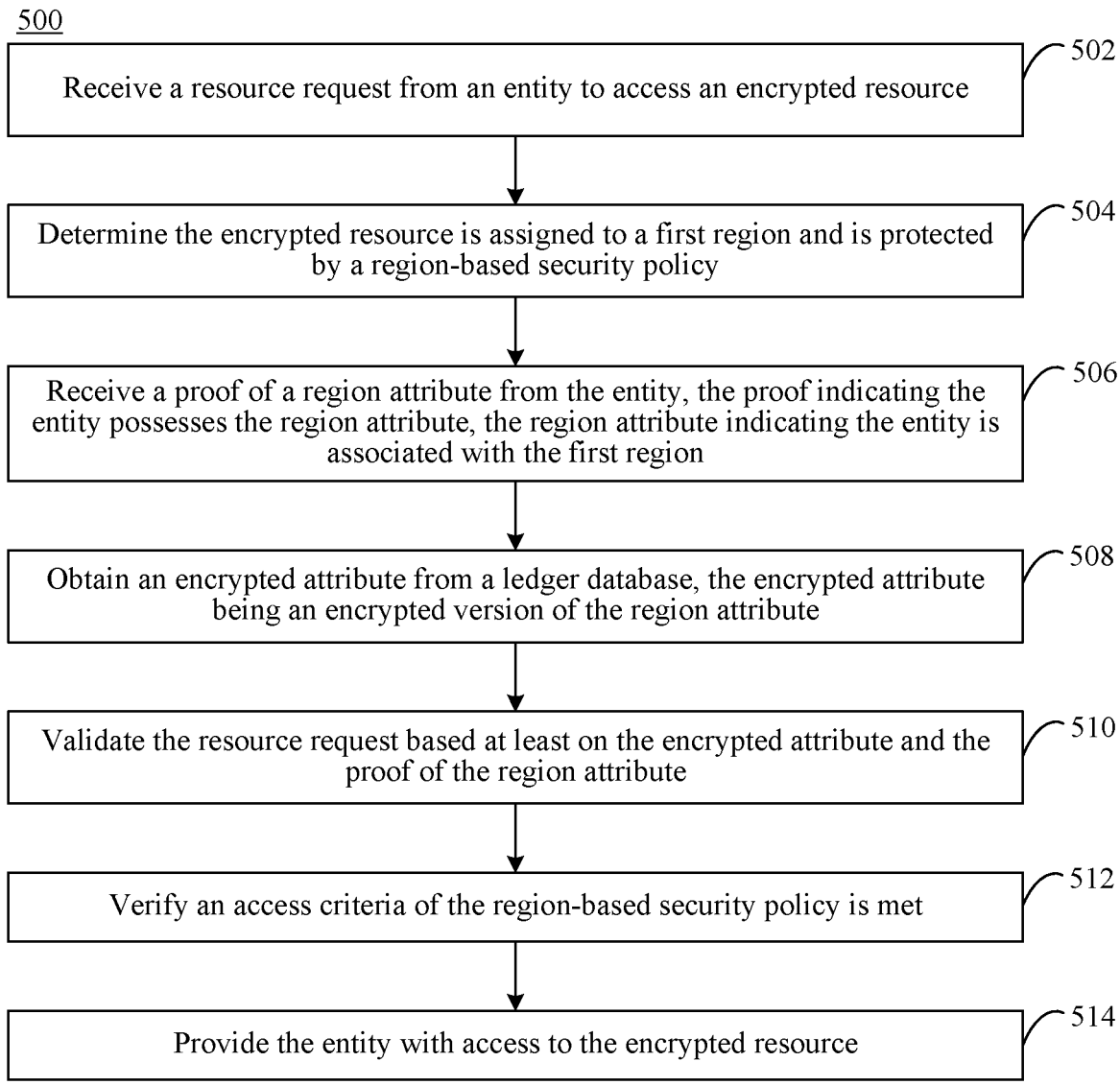
FIG. 5A shows a flowchart of a process for accessing a resource protected by a region-based security policy in accordance with an embodiment.

For illustrative purposes, system 400 is described below with respect to FIG. 5A. FIG. 5A shows a flowchart 500 of a process for accessing a resource protected by a region-based security policy in accordance with an embodiment. System 400 may operate according to flowchart 500 in embodiments. Not all steps of flowchart 400 need be performed in all embodiments. Further structural and operational embodiments will be apparent to persons skilled in the relevant art(s) based on the following descriptions of FIGS. 4 and 5A.

Flowchart 500 begins with step 502. In step 502, a resource request is received from an entity to access an encrypted resource. For instance, proof requester 290 of FIG. 4 receives a resource request 446 from application 416N to access encrypted resource 126. In accordance with an embodiment, resource request 446 includes an entity ID that uniquely identifies the entity associated with application 416N (e.g., Entity N) and/or a resource ID that uniquely identifies encrypted resource 126. In accordance with an embodiment and as discussed further with respect to step 506, resource request 446 comprises a proof of an attribute (e.g., generated by proof generator 448). In accordance with an embodiment, and as discussed further with respect to FIG. 6, resource request 446 comprises a digest representative of the state of ledger database 224. Continuing the non-limiting running example, suppose Entity N is requesting access to encrypted resource 126 (e.g., to verify private information of Entity A, or to otherwise perform an operation with respect to Entity A's private information).

In step 504, a determination that the encrypted resource is assigned to a first region and is protected by a region-based security policy is made. For instance, proof requester 290 of FIG. 4 determines that encrypted resource 126 is protected by security policy 128. For example, proof requester 290 of FIG. 4 obtains policy information 448 from policy manager 110. In this context, policy information 448 indicates that encrypted resource 126 is protected by security policy 128 (e.g., that encrypted resource 126 is encrypted with an encryption key of security policy 128). Alternatively, proof requester 290 obtains policy information from policy map 240. For instance, and with continued reference to the non-limiting running example, suppose resource request 446 includes a resource identifier that uniquely identifies encrypted resource 126. In this context, proof requester 290 accesses policy map 240 to obtain policy information indicating which policies encrypted resource 126 is protected by (if any). Thus, proof requester 290 receives policy information from policy map 240 (not shown in FIG. 4), determines that encrypted resource 126 is protected by security policy 128, and determines that Entity N must present proof of possessing Secret A1, Secret A2, or Secret A3 in order to be authorized to access encrypted resource 126.

In step 506, a proof of a region attribute is received from the entity. The proof indicates that the entity possesses the region attribute. The region attribute indicates the entity is associated with the first region. For instance, proof validator 234 of FIG. 4 receives a proof that indicates the entity possesses the region attribute. Depending on the implementation, the region attribute indicates the entity is located in the first region, is a citizen of the first region, is an organization headquartered in the first region, is a service assigned to the first region, is a government entity of the first region, and/or is otherwise associated with and/or assigned to the first region, as described elsewhere herein. In accordance with an embodiment, the proof of the region attribute (also referred to as an "attribute proof") is included in resource request 446. In accordance with another embodiment, application 416N is prompted to provide the attribute proof to proof validator 234. For instance, as shown in FIG. 4 and with continued reference to the running example, proof requester 290 (or another component of verification system 106) transmits a proof request 450 to application 416N that prompts application 416N to provide validation request 452 (e.g., via prompting Entity N to provide the attribute proof or via proof generator 448 to generate the attribute proof). Additional details regarding prompting an entity to provide an attribute proof are discussed with respect to FIG. 5B.

Proof generator 448 is associated with application 416N. In accordance with an embodiment, proof generator 448 incorporated in application 416N. In accordance with another embodiment, proof generator 448 is a separate component (e.g., software application, hardware-based proof generator, etc.) from the application 416N. Proof generator 448 is configured to generate a zero-knowledge cryptographic proof based at least on an unencrypted version of a region attribute (e.g., of entity attribute information 418N). In accordance with an embodiment, proof generator 448 in accordance with an embodiment generates a zero-knowledge cryptographic proof based at least on an unencrypted version of a secret that corresponds to the region attribute (e.g., Secret A2). As shown in FIG. 4, attribute information 418N is stored locally by entity computing device 134N. Alternatively, attribute information 418N may be stored in an external storage accessible to entity computing device 134N (e.g., over a network). As described elsewhere herein, encrypted versions of region attributes (and/or corresponding secrets) are stored in attribute map 238 maintained by ledger database 224.

In accordance with an embodiment, and with reference to the running example, proof generator 448 of FIG. 4 is configured to generate the zero-knowledge cryptographic proof of the region attribute based at least on the unencrypted version of Secret A2, a public key of Entity N, and an encryption algorithm used to encrypt a set of data. In accordance with an embodiment, proof generator 448 generates the cryptographic proof based on a zero-knowledge protocol, such as, but not limited to, Schnorr's protocol. In examples, while proof generator 448 generates a value using the unencrypted version of Secret A2 (which is deemed private), the generated value does not include the unencrypted secret. In other words, the generated value of the cryptographic proof cannot be used to reconstruct any unencrypted secret. In this manner, proof generator 448 provides a proof that proves that Entity N possesses a given region attribute (or secret corresponding to the region attribute), despite not relaying the region attribute or secret.

In various embodiments, the (zero-knowledge) proof of the region attribute (also referred to as the "attribute proof") comprises information that is used to prove that the entity (e.g., Entity N) possesses the value of a region attribute or corresponding secret (e.g., Secret A2), and that if that value is inputted into an encryption algorithm, then the value of an encrypted version of Secret A2 (e.g., stored in attribute map 238) will be obtained. In various other embodiments, other algorithms are used, such as a secure hash algorithm (SHA) instead of an encryption algorithm. For instance, with respect to the running example, the zero knowledge proof in such a case would be used to prove that if the value of Secret A2 is inputted into a SHA, the value of the encrypted version of Secret A2 stored in attribute map 238 will be obtained (provided that the value in attribute map 238 is also based on this algorithm). Other techniques are also contemplated herein, and disclosed techniques for providing a zero-knowledge proof are not limited to these illustrative examples. In some further implementations, the zero-knowledge proof is not re-playable. For example, in some embodiments, proof validator 234 generates a random number for each session (e.g., each new communication session in which entity computing device 134N seeks to access encrypted resources), and provides the randomly generated number to proof generator 448 to be used as part of the proof generation process. Thus, even if the same proof was attempted to be used for a subsequent session (either by the same computing device or in a malicious fashion by a different system), the proof would not succeed because the subsequent session would have a different randomly generated number that is to be used as part of the proof generation process.

In step 508, an encrypted attribute is obtained from the ledger database. The encrypted attribute is an encrypted version of the region attribute. For example, proof validator 234 obtains encrypted attribute information comprising an encrypted version of the region attribute (or corresponding secret) from attribute map 238 via signal 454. In accordance with an embodiment, signal 454 also includes a public key obtained from identity map 236. Proof validator 234 obtains encrypted attribute information (e.g., an encrypted version of a region attribute, an encrypted version of a secret corresponding to the region attribute (e.g., Secret A2), and/or the like) from attribute map 238 based on an entity ID that uniquely identifies Entity N. The entity ID may be included in validation request 452 and/or resource request 446. Proof validator 234 accesses attribute map 238 based on the entity ID and obtains corresponding encrypted attribute information associated with the entity ID. For instance, in the running example, proof validator 234 accesses attribute map 238 to obtain an encrypted version of Secret A2 associated with an entity ID of Entity N. Additional details regarding obtaining encrypted versions of attribute information from attribute maps are discussed with respect to FIG. 6, as well as elsewhere herein.

In step 510, the resource request is validated based at least on the encrypted attribute and the proof of the region attribute. For example, proof validator 234 validates resource request 446 based on the encrypted attribute (e.g., included in signal 454) and the proof of the region attribute (e.g., included in resource request 446 or validation request 452). In accordance with an embodiment, proof validator 234 validates resource request 446 without decrypting the encrypted attribute information (e.g., encrypted attributes, encrypted secrets (e.g., the encrypted version of Secret A2), etc.). In accordance with an embodiment, proof validator 234 determines if the proof of the attribute provided in validation request 452 (or included in resource request 446) corresponds to an encrypted version of Secret A2. In accordance with an embodiment, proof validator 234 determines if the proof of the attribute corresponds to the encrypted version of Secret A2 based at least on two or more of the proof, the encrypted version of Secret A2, and a public key corresponding to the encrypted attribute information (e.g., a public key of entity key pair 488N or a public key of authority key pair 246A). In accordance with an embodiment, proof validator 234 validates the proof based on a zero-knowledge protocol, such as, but not limited to, Schnorr's protocol. In one implementation, validation of the proof is performed by comparing a first value generated by proof validator 234 that is determined from the encrypted version of Secret A2 obtained from attribute map 238 and the public key corresponding to Entity N obtained from identity map 236 with a second value that is based on the proof. In response to determining that the proof corresponds to the encrypted attribute (e.g., or encrypted secret), proof validator 234 validates resource request 446 and generates indication 456, indicating the request is valid (e.g., the proof of the attribute indicates Entity N possesses Secret A2) and flowchart 500 continues to step 512.

In step 512, a verification is made that an access criteria of the region-based security policy is met. For example, policy verifier 232 verifies that an access criteria of security policy 128 is met (e.g., based on policy information 448). In accordance with an embodiment, policy verifier 232 verifies that the access criteria of security policy 128 is met in response to receiving indication 456 from proof validator 234. For instance, in the running example, policy verifier 232 analyzes security policy 128 (e.g., the region-based security policy set by Authority A of Region A) and determines that access criteria of the policy is met if resource request 446 is validated. If policy verifier 232 verifies that the access criteria is met, policy verifier 232 provides indication 458 to resource handler 230 and flowchart 500 continues to step 514.

In step 514, the entity is provided with access to the encrypted resource. For example, resource handler 230 provides access to encrypted resource 126 to the entity associated with entity computing device 134N. For instance, in the running example, resource handler 230 provides access to Entity A's encrypted resource 126 to Entity N. In accordance with an embodiment, resource handler 230 obtains the encrypted resource and provides a response 468 to application 416N that includes the encrypted resource. Alternatively, resource handler 230 decrypts the encrypted resource and includes the decrypted version of the resource in response 468. In accordance with an embodiment, response 468 includes (e.g., an encrypted version of) a decryption key (e.g., decryption key 286) for decrypting encrypted resource 126. Additional details regarding providing entities access to resources protected by region-based security policies is described further with respect to FIGS. 5C and 5D.

As described herein, proof validator 234 is described as validating proofs of a region attribute. In accordance with an embodiment, proof validator 234 validates multiple proofs of attributes (e.g., simultaneously or sequentially) (e.g., multiple region attributes or multiple attributes including a region attribute). For instance, suppose security policy 128 requires an entity to possess multiple attributes (e.g., including a region attribute) in order to access encrypted resource 126. As a non-limiting example, suppose security policy 128 requires an entity to possess a first secret that corresponds to a region attribute indicating that the entity is associated with Region A (e.g., Secret A1, Secret A2, and/or Secret A3) and a second secret that corresponds to a security clearance attribute indicating that the entity possesses a particular level of security clearance (e.g., "Secret B"). In this context, resource request 446 or validation request 452 may include proof of each required secret (e.g., Secret A2 and Secret B). In this context, proof validator 234 determines whether resource request 446 is valid based on whether each proof indicates the entity possesses the corresponding attribute(s). Proof validator 234 obtains an encrypted version of Secret A2 and Secret B from attribute map 238. If proof validator 234 determines that the proof of Secret A2 corresponds to the encrypted version of Secret A2 and that the proof of Secret B corresponds to the encrypted version of Secret B, proof validator 234 validates resource request 446 and generates indication 456. Policy verifier 232 receives indication 456 and determines security policy 128 is satisfied based on the validation of the proofs of Secret A2 and Secret B.

As described herein, proof validator 234 validates proofs of (e.g., region) attributes and policy verifier 232 verifies that the validated proofs satisfy a security policy. It is further contemplated herein that resources may be protected by multiple security policies (e.g., including a region-based policy). For instance, suppose encrypted resource 126 is protected by security policy 128 specified by Authority A and an entity-specified security policy specified by Entity A (not shown in FIG. 4). In this context, security policy 128 requires an entity to possess a first secret that corresponds to a region attribute indicating that the entity is associated with Region A (e.g., Secret A1, Secret A2, and/or Secret A3) and the entity-specified security policy requires an entity possesses a second secret that corresponds to an authorization attribute indicating that the entity is authorized by Entity A to access private information of Entity A for identity verification purposes (e.g., "Secret C"). In this context, resource request 446 or validation request 452 may include proof of each required secret (e.g., Secret A2 and Secret C). In this context, proof validator 234 determines whether resource request 446 is valid based on whether each proof indicates the entity possesses the corresponding attribute(s). Proof validator 234 obtains an encrypted version of Secret A2 and Secret C from attribute map 238. If proof validator 234 determines that the proof of Secret A2 corresponds to the encrypted version of Secret A2 and that the proof of Secret C corresponds to the encrypted version of Secret C, proof validator 234 validates resource request 446 and generates indication 456. Policy verifier 232 receives indication 456 and determines access criteria of security policy 128 and the entity-specified security policy are satisfied based on the validation of the proofs of Secret A2 and Secret C. In accordance with an embodiment, policy verifier 232 releases access to a decryption key (e.g., only) if access criteria to each policy protecting the encrypted resource is satisfied.

In accordance with an alternative embodiment where a resource is protected by multiple security policies, the resource is encrypted using multiple encryption keys that each correspond to a respective policy (e.g., security policy 128 and the entity-specified security policy). In this context, corresponding decryption keys are released if access criteria of the corresponding policy is satisfied. The entity is (e.g., only) able to access (e.g., decrypt) the encrypted resource if it possesses each decryption key.

Figure 5B:
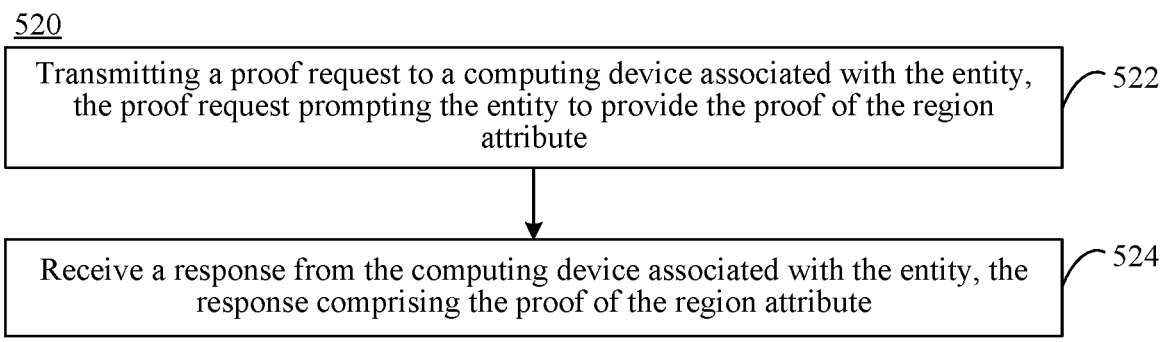
FIG. 5B shows a flowchart of a process for receiving a proof of an attribute from an entity in accordance with an embodiment.

As stated above, proof validator 234 may receive a proof of an attribute from an entity in various ways. For instance, an entity may include the proof of attribute in a resource request. Alternatively, verification system 106 (or resource handler 230, or another component of verification system 106) prompts the entity to provide the proof of attribute. For example, FIG. 5B shows a flowchart 520 of a process for receiving a proof of an attribute from an entity in accordance with an embodiment. Flowchart 520 is a further embodiment of step 506 of flowchart 500. Verification system 106 may operate according to flowchart 520 in embodiments. Not all steps of flowchart 520 need be performed in all embodiments. Further structural and operational embodiments will be apparent to persons skilled in the relevant art(s) based on the following description of 5B.

Flowchart 520 begins with step 522. In step 522, a proof request is transmitted to a computing device associated with the entity. The proof request prompts the entity to provide the proof of the region attribute. For instance, proof requester 290 of FIG. 4 transmits proof request 450 to application 416N. Proof request 450 prompts Entity N (or proof generator 448 on behalf of Entity N) to provide the proof of the attribute (e.g., the proof of Secret A2 in the running example). In response to receiving proof request 450, Entity N, application 416N, and/or proof generator 448 generates the attribute proof. For instance, and with continued reference to the running example described above with reference to FIGS. 2-5A, proof generator 448 may generate a proof that Entity N possesses Secret A2 in accordance with any of the techniques described elsewhere herein. In accordance with an embodiment where multiple attributes (e.g., including the region attribute) are required to access encrypted resource 126, proof request 450 prompts Entity N, application 416N on behalf of Entity N, and/or proof generator 448 on behalf of Entity N to generate respective proofs for each attribute (or corresponding secret). Alternatively, proof requester 290 transmits a separate proof request for each corresponding attribute.

In step 524, a response is received from the computing device associated with the entity. The response comprises the proof of the region attribute. For instance, proof validator 234 receives validation request 452 from application 416N. Validation request 452 comprises the proof of the region attribute (e.g., the proof that Entity N possesses Secret A2). In accordance with an embodiment, validation request 452 comprises an entity identifier of Entity N. In accordance with an embodiment, validation request 452 comprises multiple proofs (e.g., in embodiments where multiple attributes are required to access a resource).

System 400 of FIG. 4 may operate in various ways to provide an entity with access to a resource protected by a region-based security policy. For instance, verification system 106, as described above with respect to FIG. 4, in accordance with one or more embodiments is a trusted verification system (e.g., a trusted LAP server) that is trusted to decrypt resources protected by a region-based security policy and operates to provide an entity with access to resources protected by security policy 128. For example, FIG. 5C shows a flowchart 530 of a process for providing a decrypted resource to an entity in accordance with an embodiment. Flowchart 530 is a further embodiment of step 514 of flowchart 500. Verification system 106 may operate according to flowchart 530 in embodiments. Not all steps of flowchart 530 need be performed in all embodiments. Further structural and operational embodiments will be apparent to persons skilled in the relevant art(s) based on the following description of FIG. 5C.

Flowchart 530 begins with step 532. In step 532, the encrypted resource is decrypted. For example, policy verifier 232, as described with respect to FIG. 4, (or another component of verification system 106 not shown in FIG. 4 (e.g., a decryptor)) decrypts encrypted resource 126. Verification system 106 may decrypt encrypted resource 126 in various ways. In accordance with an embodiment (e.g., and in response to verifying that the access criteria of security policy 128 is met), policy verifier 232 (or another component of verification system 106) sends a key request 460 for decryption key 286 associated with encrypted data 126 to key manager 284. For instance, in the context of the running example described above with respect to FIGS. 2-5B, key request 460 specifies a policy ID that uniquely identifies security policy 128 (e.g., the policy that Entity A's encrypted resource (e.g., encrypted resource 126) is protected by). In this context, key manager 284 returns decryption key 286 to verification system 106 via a key response 462. In accordance with an embodiment, key request 460 comprises a secret (e.g., a LAP server secret) (or an encrypted version of the secret) that key manager 284 analyzes to verify whether key response 462 is valid. In accordance with an embodiment, key manager 284 validates using a proof validator (not shown in FIG. 4) that operates in a similar manner to proof validator 234. Policy verifier 232 (or another component of verification system 106) sends a resource request (not shown in FIG. 4) for Entity A's encrypted resource to data source 112. The resource request specifies a resource identifier that uniquely identifies Entity A's encrypted resource. Data source 112 returns Entity A's encrypted resource to verification system 106, which decrypts the encrypted resource using decryption key 286.

In step 534, the decrypted resource is provided to the entity. For example, in the context of the running example, policy verifier 232 (or another component of verification system 106 (e.g., a decryptor) not shown in FIG. 4) provides a decrypted version of Entity A's encrypted resource (e.g., encrypted resource 126) to Entity N, via a response not shown in FIG. 4. In accordance with an embodiment, verification system 106 encrypts the decrypted version of Entity A's data with a public key (e.g., a public key of Entity N (as stored in identity map 236), a public key of application 416N, a public key of a document management and storage system (e.g., Microsoft SharePoint™ published by Microsoft® Corp.) that is to decrypt the resource, etc.). Verification system 106 obtains the public key from identity map 236, as described elsewhere herein. In accordance with such an embodiment, verification system 106 transmits the resource encrypted with the public key to resource handler 230 and resource handler 230 transmits the encrypted resource to application 416N. By doing so, the decrypted version of encrypted resource 126 is protected from rogue users that may compromise resource handler 230. In accordance with an alternative embodiment, verification system 106 (e.g., directly) transmits the resource encrypted with the public key to application 416N. By doing so, the decrypted version of encrypted resource 126 is protected from rogue users that may intercept communications between verification system 106 and Entity N.

As discussed above, system 400 of FIG. 4 may operate in various ways to provide an entity with access to a resource protected by a region-based security policy. For instance, verification system 106, as described above with respect to FIG. 4, in accordance with one or more embodiments, is not trusted to decrypt resources protected by a region-based security policy (e.g., an untrusted verification system or a partially trusted verification system (e.g., a verification system authorized to verify access criteria of a security policy is met, but not authorized to decrypt resources)) and operates to authorize another component of system 400 (e.g., resource handler 230), or external to system 400, to provide an entity with access to resources protected by security policy 128. For example, FIG. 5D shows a flowchart 540 of a process for authorizing a resource handler to provide a decrypted resource to an entity in accordance with an embodiment. Flowchart 540 is a further embodiment of step 514 of flowchart 500. System 400 may operate according to flowchart 540 in embodiments. Flowchart 540 need not be performed in all embodiments. Further structural and operational embodiments will be apparent to persons skilled in the relevant art(s) based on the following description of FIG. 5D.

Flowchart 540 includes step 542. In step 542, a resource handler is authorized to decrypt the resource and provide the decrypted resource to the entity. For example, as shown in FIG. 4, policy verifier 232 provides indication 458 to resource handler 230, authorizing resource handler 230 to decrypt encrypted resource 126 protected by security policy 128 and provide the decrypted resource to the entity. For instance, in accordance with the running example described above with respect to FIGS. 2-5B, policy verifier 232 sends key request 460 to key manager 284 and receives key response 284 in a manner similar to the example described above with respect to FIG. 5C. Alternative to the example described above with respect to FIG. 5C, key manager 284 encrypts decryption key 286 in a manner that prevents policy verifier 232 (or another component of verification system 106) from accessing a decrypted version of decryption key 286. For instance, key manager 284 in accordance with an embodiment encrypts decryption key 286 using a public key of a key pair of resource handler 230 (not shown in FIG. 4). In this context, policy verifier 232 receives the encrypted version of decryption key 286 and sends decryption key 286 to resource handler 230 (e.g., via indication 458). Resource handler 230 decrypts the encrypted version of decryption key 286 and uses it to decrypt Entity A's encrypted data. For example, as also shown in FIG. 4, resource handler 230 also sends a resource request 464 for Entity A's encrypted data to data source 112. Resource request 464 specifies a resource identifier that uniquely identifies Entity A's encrypted resource. Data source 112 returns Entity A's encrypted data via resource response 466. Resource handler 230 decrypts Entity A's encrypted resource using decryption key 286 and provides the decrypted version of the encrypted resource to Entity N, a user on behalf of Entity N, and/or an application on behalf of Entity N (e.g., shown as application 416N of entity computing device 134N in FIG. 4) via a response 468.

In accordance with an embodiment, resource handler 230 encrypts the decrypted version of encrypted resource 126 with a public key (e.g., a public key of Entity N (as stored in identity map 236), a public key of application 416N, a public key of a document management and storage system (e.g., Microsoft SharePoint™ published by Microsoft® Corp.) that is to decrypt the resource, etc.). Resource handler 230 obtains the public key from an identity map (e.g., identity map 236), as described elsewhere herein. In accordance with such an embodiment, data handler 230 sends the resource encrypted with the public key to a respective application of Entity N (e.g., application 416N). By doing so, the decrypted version of encrypted resource 126 is protected from rogue users that may intercept communications between resource handler 230 and Entity N.

In accordance with an embodiment, resource handler 230 is a trusted resource handler. In this context, resource handler 230 is trusted to decrypt encrypted resource 126.

In accordance with another embodiment, resource handler 230 is not a trusted resource handler. In this context, key request 460 includes an identity corresponding to Entity N or a decryptor (not shown in FIG. 4) authorized to decrypt resources protected by security policy 128 (e.g., a secure enclave, a secure server, or another suitable application and/or device for securely decrypting resources protected by region-based security policies). For instance, with respect to the running example described with respect to FIG. 5D above, in response to receiving key request 460, key manager 284 obtains a public key from identity map 236 based at least on the identity included in key request 460 (e.g., the identity of Entity N). Key manager 284 encrypts decryption key 286 with the public key obtained from identity map 236 and provides the encrypted version of decryption key 286 to policy verifier 232 via key response 462. Policy verifier 232 provides the encrypted version of decryption key 286 to resource handler 230 (e.g., via indication 458). Resource handler 230 obtains Entity A's encrypted resource (e.g., encrypted resource 126), as described above, and provides the encrypted version of decryption key 128 and Entity A's encrypted resource (e.g., via response 468 of FIG. 4) to Entity N, a user on behalf of Entity N, and/or an application (e.g., application 416N or a decryptor external to application 416N) that decrypts Entity A's encrypted resource using Entity A's decryption key on behalf of Entity N. By doing so, the decrypted version of Entity A's encrypted data and the decrypted version of decryption key 128 are protected from rogue users that may infiltrate verification system 106 and/or resource handler 230 while still preventing Entity N from independently accessing the decrypted version of encrypted resource 126 without the access criteria of security policy 128 having been met.

In accordance with another embodiment, verification system 106 is not a trusted verification system (or, alternatively, a partially trusted verification system authorized to verify access criteria of a security policy is met, but not authorized to decrypt resources), resource handler 230 is not a trusted resource handler, and key manager 284 is not a trusted key manager. For instance, with respect to the running example described with respect to FIG. 5D above, in another aspect, decryption key 286 is encrypted prior to providing decryption key 286 to key manager 284 (e.g., by Entity A (or an application on behalf of Entity A) as part of or prior to steps 312-324 of FIG. 3A, or by Authority A (or an application on behalf of Authority A) when setting security policy 128). In this context, key manager 284, in response to receiving key request 460, provides the encrypted version of decryption key 286 to policy verifier 232 via key response 462. Policy verifier 232 provides the encrypted version of decryption key 286 to resource handler 230. Resource handler 230 provides the encrypted version of decryption key 286 (e.g., via response 468 of FIG. 4) to Entity N, a user on behalf of Entity N, and/or an application (e.g., application 416N) that decrypts the encrypted version of decryption key 286 on behalf of Entity N. By doing so, the decrypted version of Entity A's encrypted resource and the decrypted version of decryption key 286 are protected from rogue users that may infiltrate verification system 106, key manager 284, and/or resource handler 230 while still preventing Entity N from independently accessing the decrypted version of encrypted resource 126 without the access criteria of security policy 128 having been met. For instance, as a non-limiting example, suppose Authority A encrypts decryption key 286 with a public key of a secure enclave (not shown in FIG. 4). In this context, subsequent to policy verifier 232 determining that access criteria of security policy 128 is met and providing resource handler 230 with the encrypted version of decryption key 286, resource handler 230 provides the encrypted version of decryption key 286 to the secure enclave (or to Entity N to provide to the secure enclave). The secure enclave decrypts decryption key 286 using a private key of the secure enclave that corresponds to the public key Authority A used to encrypt decryption key 286. In accordance with a further embodiment, the secure enclave provides the decrypted version of decryption key 286 to Entity N so that Entity N may decrypt encrypted resource 126. Alternatively, secure enclave obtains encrypted resource 126, decrypts encrypted resource 126 using the decrypted version of decryption key 286, and provides the decrypted version of encrypted resource 126 to Entity N (e.g., without providing Entity N access to the decrypted version of decryption key 286). In this context, the decrypted version of decryption key 286 is protected from rogue users that may infiltrate Entity N's computing device and/or communications between Entity N and the secure enclave.

As discussed above, in accordance with one or more embodiments, resource handler 230 obtains encrypted resource 126 from data source 112 and provides either a decrypted version of encrypted resource 126, a partially decrypted version of encrypted resource 126, or an encrypted version of encrypted resource 126 and an encrypted decryption key 286 to Entity N, a user on behalf of Entity N, and/or an application that decrypts encrypted resource 126 on behalf of Entity N, e.g., via response 468 shown in FIG. 4. In accordance with one or more alternative embodiments, resource handler 230 does not obtain encrypted resource 126. For instance, with respect to the running example described with respect to FIG. 5D above, in another aspect, resource handler 230 obtains decryption key 286 (or an encrypted version of decryption key 286), as described above, and provides the decryption key (e.g., via response 468 of FIG. 4) to Entity N, the user, and/or the application. Entity N, the user, and/or the application accesses Entity A's encrypted resource (e.g., encrypted resource 126) (e.g., from data source 112, from an on-premises data source, or from another data source accessible to the Entity, the user, and/or the application) and uses decryption key 286 to decrypt Entity A's encrypted resource. By doing so, Entity A's encrypted resource is further protected from rogue users that may intercept communications between Entity N and resource handler 230. Furthermore, by not including Entity A's encrypted resource in access response 468, fewer computing resources are used by resource handler 230, as resource handler 230 does not need to obtain Entity A's encrypted resource from data source 112.

As discussed above with respect to FIG. 5D, policy verifier 232 obtains decryption key 286 (or an encrypted version of decryption key 286) and provides the decryption key to resource handler 230 via indication 458. In accordance with one or more alternative embodiments, policy verifier 232 does not obtain decryption key 286. For instance, with respect to the various examples described with respect to FIG. 5D above, in another aspect, policy verifier 232 provides indication 458 to resource handler 230 in response to determining access criteria of security policy 128 is satisfied (e.g., without obtaining decryption key 286 from key manager 284). In response to receiving indication 458, resource handler 230 transmits a key request (not shown in FIG. 4) to key manager 284 (e.g., for decryption key 286 or for an encrypted version of decryption key 286), in a similar manner to the processes described with respect to policy verifier 232 transmitting key request 460 to key manager 284. Furthermore, in some embodiments (e.g., wherein verification system 106 is trusted to verify access criteria of security policy 128 is met but does not decrypt resources protected by security policy 128), indication 458 includes a secret (e.g., a LAP server secret) (or an encrypted version of the secret) that resource handler 230 provides to key manager 284 (e.g., in the transmitted key request) to indicate that policy verifier 232 has verified the access criteria of security policy 128 has been satisfied by Entity N. Resource handler 230 receives a key response (not shown in FIG. 4) in a similar manner to policy verifier 232 receiving key response 462. By doing so, decryption key 286 is further protected from rogue users that may compromise verification system 106 and/or communications in between verification system 106 and other components of system 400. Furthermore, by not including decryption key 286 in indication 458, fewer computing resources are used by verification system 106, as verification system 106 does not need to obtain decryption key 286 from key manager 284.

As discussed above system 400 of FIG. 4 may operate in various ways to access a decryption key used to decrypt a resource protected by a region-based security policy. For instance, several examples are described with respect to obtaining decryption key 286 from key manager 284. It is also contemplated herein that verification system 106, resource handler 230, application 416N, a decryptor (not shown in FIG. 4) of system 400, a secure enclave of entity computing device 134N (not shown in FIG. 4), a secure server of system 400 (not shown in FIG. 4), and/or another component or subcomponent of system 400 suitable for decrypting resources protected by security policy 128 may compute a decryption key using a cryptographic algorithm in lieu of obtaining a decryption key from key manager 284. In this context, cryptographic algorithm receives one or more shared secrets, where the one or more shared secrets correspond to attributes required to be possessed by a requesting entity (e.g., Entity N) as specified in security policy 128. Each of the one or more secret shares provided to the cryptographic algorithm comprises a portion of a decryption key (e.g., decryption key 286) that is used to decrypt encrypted resource 126. In an embodiment, entity computing device 134N after providing proof that Entity N possesses the proper attributes (including the region attribute) (e.g., in response to policy verifier 232 verifying that access criteria of security policy 128 is met). In accordance with another embodiment, entity computing device 134N provides the one or more shared secrets to the cryptographic algorithm before, or even concurrently with, providing proof to verification system 106. In implementations, the shared secrets comprise unencrypted private keys, each private key corresponding to a public key of an attribute stored in attribute map 238. In some implementations, shared secrets are provided to verification system 106 (e.g., in resource request 446, in validation request 452, in a separate communication to verification system 106 not shown in FIG. 4), and verification system 106 provides the shared secrets to the cryptographic algorithm upon verification of the proofs. In other implementations, entity computing device 134N provides the shared secrets to the cryptographic algorithm (e.g., directly).

In accordance with an embodiment, the above-mentioned cryptographic algorithm generates (or recovers) decryption key 286 based on a secret share corresponding to a region requirement (e.g., proof that Entity N possesses the region attribute (e.g., a static region attribute (e.g., assigned to Entity N by Authority A and indicating Entity N is assigned to Region A), proof that Entity N possesses a dynamic region attribute (e.g., indicating Entity N is located in Region A), and/or proof that Entity N possesses a static region attribute and a dynamic region attribute)). In accordance with an embodiment, the cryptographic algorithm generates (or recovers) decryption key 286 based on the secret share corresponding to the region requirement and one or more additional secret shares corresponding to other attributes possessed by Entity N that are required to access encrypted resource 126. In accordance with an embodiment, the cryptographic algorithm combines the shared secrets to generate decryption key 286. For example, the cryptographic algorithm sums the shared secret corresponding to the region requirement with the one or more additional secret shares to generate decryption key 286. In another example, the cryptographic algorithm performs a polynomial evaluation with respect to these shared secrets to generate decryption key 286. It is noted that any number of portions of decryption key 286 are released in an embodiment and combined to generate decryption key 286. For example, a portion is released for each proof that is verified, where a proof is received for each attribute.

Embodiments of proof validator 234, as described above with respect to FIG. 4, may operate in various ways to obtain encrypted attributes from ledger databases. For instance, proof validator 234 in accordance with one or more embodiments obtains encrypted attributes (or encrypted secrets corresponding to the attributes) from a ledger database in a tamper proof and/or tamper evident manner. For example, FIG. 6 shows a flowchart 600 of a process for obtaining an encrypted attribute from a ledger database in accordance with an embodiment. Flowchart 600 is a further embodiment of step 508 of flowchart 500, as described with respect to FIG. 5A. Proof validator 234 of FIG. 4 may operate according to flowchart 600, in embodiments. Not all steps of flowchart 600 need be performed in all embodiments. Further structural and operational embodiments will be apparent to persons skilled in the relevant art(s) based on the following description of FIG. 6.

Flowchart 600 begins with step 602. In step 602, a digest representative of a state of the ledger database is received from the entity. For example, resource request 446 or validation request 452 comprises a respective digest representative of a state of ledger database 224. For example, continuing the running example described above in reference to FIG. 5A, proof validator 234 receives validation request 452. In this context, validation request 452 comprises a proof of attribute and a digest representative of the state of ledger database 224. In accordance with an embodiment, validation request 452 comprises an identity (or a reference thereto) of the entity (e.g., Entity N of entity computing device 134N). In accordance with another embodiment, validation request 452 comprises a policy ID representative of a security policy (e.g., security policy 128) that the respective attribute is associated with. In accordance with an embodiment, the proof, the digest, the identity, and/or the policy ID are included in separate requests to proof validator 234. It is noted in some embodiments, that a plurality of digests is provided to proof validator 234, where the plurality of digests comprises some or all of the digests previously generated by a ledger of ledger database 224.

In step 604, the ledger database is validated based at least on the digest. For example, proof validator 234 of FIG. 4 provides the one or more digests ("digests") received in step 602 to DB host 108 (not shown in FIG. 4) that hosts ledger database 224. In accordance with an embodiment, proof validator 234 provides an attribute request to DB host 108 (not shown in FIG. 4) that comprises the digests and an identity of requesting identity (e.g., Entity N). The digests are validated by DB host 108. If the digests are not validated, DB host 108 determines that the ledger has been tampered with and issues a notification indicating the ledger has been tampered with to proof validator 234, one or more entity computing devices (e.g., entity computing device 134A, entity computing device 134N, etc.), and/or an authority system associated with the ledger database (e.g., authority system 104A).

In response to validating the respective digest, an encrypted attribute is obtained. For instance, in response to validating the respective digest, DB host 108 in accordance with an embodiment retrieves a corresponding encrypted attribute (or encrypted secret corresponding to the attribute) from a table (e.g., attribute map 238) (e.g., based on a respective identity and/or policy ID included in the request). Once the digest has been validated, flowchart 600 continues to step 606.

In step 606, a response comprising the encrypted attribute is received from the ledger database. For example, proof validator 234 receives signal 454 from ledger database 224. In this context, signal 454 is a response signal comprising an encrypted attribute (or encrypted secret corresponding to the attribute) located by ledger database 224, as described above and/or as would be understood by one ordinarily skilled in the relevant art(s) having benefit of this disclosure. For instance, with reference to the running example described with respect to FIGS. 4 and 5A, signal 454 comprises an encrypted version of Secret A2. In accordance with an embodiment, proof validator 234 receives signal 454 from DB host 108 subsequent to DB host 108 obtaining the encrypted attributes from attribute map 238. In accordance with an embodiment, signal 454 (e.g., received from DB host 108) includes an indication that the digest is valid.

As described above with respect to flowchart FIG. 6, DB host 108 validates ledger database 224 based at least on one or more digests received from Entity N. However, it is also contemplated herein that verification system 106 (or a component thereof (e.g., proof validator 234)) may validate ledger database 224 in a similar manner as described with respect to flowchart 600 of FIG. 6. For example, verification system 106 in accordance with an embodiment receives a first digest from Entity N (e.g., via validation request 452) and a second digest from ledger database 224 (or from DB host 108). Verification system 106 compares the two digests and, if the digests match, determines that ledger database 224 has not been tampered with. If the digests do not match, verification system 106 determines that the ledger has been tampered with and issues a notification indicating the ledger has been tampered with to one or more entity computing devices (e.g., entity computing device 134A, entity computing device 134N, etc.) and/or an authority system associated with the ledger database (e.g., authority system 104A).

V. Example Embodiments for Implementing Region-Based Security Policies

As discussed above, verification systems and/or components thereof such as verification system 106 of FIG. 1 implement region-based security policies. Accordingly, embodiments of verification systems condition the access of resources protected by region-based security policies to a requesting entity based at least on a region to which the resource and the requesting entity are assigned. In order to better illustrate some embodiments of the present disclosure, several example systems and corresponding scenarios are described below.

Figure 7:
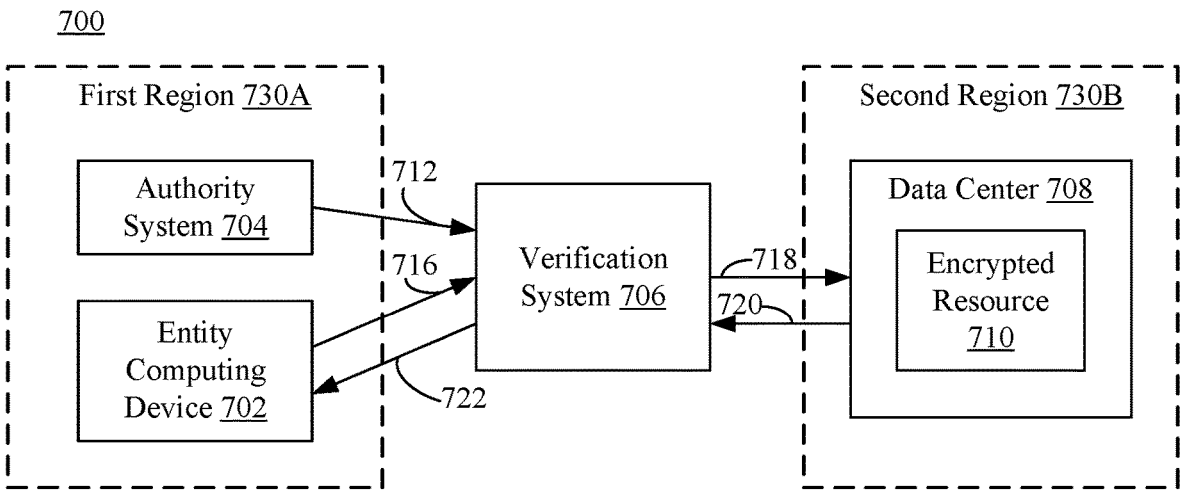
FIG. 7 shows a block diagram of an example system for implementing region-based security policies for cloud resources in accordance with an example embodiment.

FIG. 7 shows a block diagram of an example system 700 for implementing region-based security policies for cloud resources in accordance with an example embodiment. As shown in FIG. 7, system 700 includes an entity computing device 702, an authority system 704, an verification system 706, and a data center 708. Entity computing device 702 operates in a similar manner to entity computing device 134A and/or entity computing device 134N, authority system 804 operates in a similar manner to authority system 104A, verification system 706 operates in a similar manner to verification system 106, and data center 708 operates in a similar manner to data source 712, as each respectively described above in reference to FIGS. 1-6. As also shown in FIG. 7, data center 708 stores encrypted resource 710. System 700 may include any additional components not shown in FIG. 7 for brevity (e.g., additional authority systems, additional entity computing devices, other data sources, policy managers, DB hosts, key managers, resource handlers, etc.). In accordance with an embodiment, verification system 706 is a LAP server. In accordance with an embodiment, verification system 706 is a trusted verification system (e.g., a verification system trusted by the authority of authority system 704 to verify whether access criteria of security policies of the authority is met, access decryption keys used to decrypt resources protected by such security policies, compute decryption keys used to decrypt resources protected by such security policies, and/or decrypt encrypted resources protected by such security policies).

As also shown in FIG. 7, authority system 704 and entity computing device 702 are located in a first region 730A ("Region 730A" herein), and data center 708 is located in a second region 730B ("Region 730B" herein). Verification system 706 in accordance with an embodiment is a global verification system distributed across many regions in a cloud computing platform. In accordance with another embodiment, verification system 706 is located in one of Region 730A, Region 730B, or another region not shown in FIG. 7 for brevity. Each of Regions 730A and 730B may include additional authority systems, entity computing devices, and/or data centers, not shown in FIG. 7 for brevity. Furthermore, embodiments of system 700 may include any number of regions in addition to and/or in lieu of Region 730A and/or Region 730B. In view of the foregoing context, several example scenarios are described below with respect to system 700.

In a first non-limiting example scenario, authority system 704 is associated with a government authority of Region 730A ("Authority 730A"), entity computing device 702 is a computing device of a citizen of Region 730A ("Citizen A") that possesses a "Citizen of Region 730" attribute ("Attribute A"), and encrypted resource 710 is private data of Citizen A protected by a region-based security policy of Authority 730A ("Policy A"). In this scenario, authority system 804 transmits an update request 712 to verification system 706. Update request 712 includes a request to update Policy A to limit access to private data of citizens of Region 730A so that only entities assigned to Region 730A (e.g., entities possessing Attribute A, or another attribute that indicates the entity is assigned to Region 730A) may access the private data. In this context, verification system 706 validates update request 712 (e.g., in a manner described with respect to step 304 of FIG. 3A) and updates a policy map corresponding to Policy A (e.g., in a manner described with respect to step 306 of FIG. 3A). By doing so, the access criteria required to access encrypted resource 710 is updated in a manner that assigns encrypted resource 710 to Region 730A, despite being stored in datacenter 708 located in Region 730B.

Suppose in this first example, Citizen A desired access to their private data (e.g., encrypted resource 710). Citizen A transmits a resource request 716 to verification system 706, the request is a request to access encrypted resource 710 and includes a proof that Citizen A possesses Attribute A. Verification system 706 determines the policy that protects encrypted resource 710 (e.g., Policy A) and determines if resource request 716 is valid utilizing the validation and verification techniques described elsewhere herein (e.g., as described with respect to steps 504-512 of FIG. 5A, steps 522 and 524 of FIG. 5B and/or steps 602-606 of FIG. 6). For instance, verification system 706 accesses an attribute map maintained by Authority A that maps entities of Region 730A to attributes assigned by Authority A. In this example, verification system 706 accesses the attribute map to obtain an encrypted version of Attribute A. Verification system 706 validates resource request 716 based at least on the encrypted version of Attribute A and the proof included in resource request 716. Verification system 706 verifies the access criteria of Policy A has been met and transmits a resource request 718 to datacenter 708 requesting encrypted resource 710. Verification system 706 receives response 720 including encrypted resource 710 and transmits a response 722 including encrypted resource 710 to entity computing device 702. Depending on the implementation, verification system 706 may decrypt encrypted resource 710, provide an encrypted version of a decryption key to entity computing device 702 for decrypting encrypted resource 710, or otherwise enable entity computing device 702 to access a decrypted version of encrypted resource 710.

In a second non-limiting example scenario, authority system 704 is associated with Authority 730A and encrypted resource 710 is private data of Citizen A protected by Policy A. However, entity computing device 702 is a computing device of a malicious user ("Hacker B") who is not assigned to Region A. For instance, suppose in this example that Hacker B is has obtained identifying credentials of Citizen A. In this example, Hacker B transmits resource request 716 that includes an identity of Citizen A requesting access to encrypted resource 710. In this context, verification system 706 determines that encrypted resource 710 is protected by Policy A and prompts Hacker B to provide a proof that indicates Hacker B possesses Attribute A. Since Hacker B does not possess Attribute A (or the unencrypted secret that corresponds to Attribute A), Hacker B generates a falsified proof and provides the falsified proof to verification system 706. Verification system 706 receives the falsified proof and obtains an encrypted version of Attribute A mapped to an identity of Citizen A (e.g., in an attribute map). Verification system 706 determines that resource request 716 is an invalid request based on the encrypted version of Attribute A and the falsified proof (e.g., determines that the proof that does not indicate Hacker B possess Attribute A). In this context, verification system 706 may transmit a notification to Citizen A and/or Authority A (or a computing device, application, and/or system of Citizen A and/or Authority A) that indicates access to encrypted resource 710 was attempted. In this example, access to encrypted resource 710 is prevented.

In a third non-limiting example scenario, authority system 704 is associated with Authority 730A, encrypted resource 710 is private data of Citizen A protected by Policy A, and entity computing device 702 is a computing device of Hacker B not assigned to Region A. However, suppose Hacker B tampers with the attribute map maintained by Authority 730A in order to associate an identity of Hacker B with Attribute A. In this example, verification system 706 (or Policy A) requires resource requests include a digest indicative of the state of the ledger database that maintains the attribute map. Hacker B, via entity computing device 702, transmits resource request 716 including the identity of Hacker B and the digest of the (e.g., tampered) ledger database. Verification system 706 provides the digest to the ledger database. The ledger database determines that the digest provided in resource request 716 is invalid and has been tampered with. In this context, the ledger database notifies verification system 706 (e.g., by providing a tamper notification to verification system 706) and verification system 706 notifies Authority A that the ledger database maintained by Authority A has been tampered with (e.g., by transmitting a notification to a computing device, a system, and/or an application of Authority A). In this example, resource request 716 is not validated and access to encrypted resource 710 is prevented.

Figure 8:
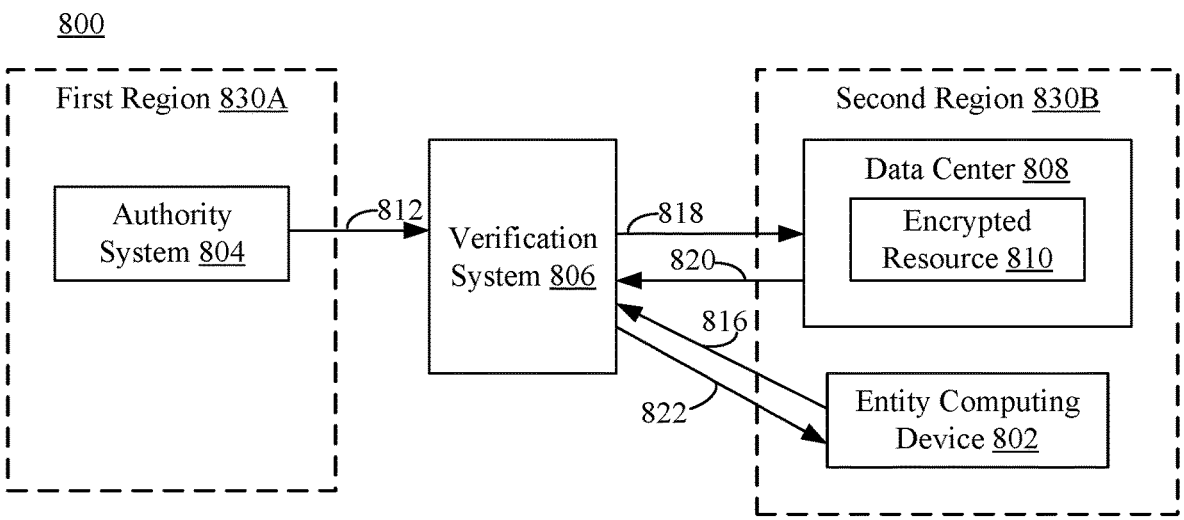
FIG. 8 shows a block diagram of an example system for implementing region-based security policies for cloud resources in accordance with another example embodiment.

Several example scenarios have been described above with respect to system 700, which includes a verification system that implements a region-based security policy. However, in accordance with one or more embodiments, an entity not physically located in a first region is attempting to access resources protected by region-based security policies of the first region. Furthermore, the entity may be physically located in a second region where the datacenter storing the resource is also located. For example, FIG. 8 shows a block diagram of an example system 800 for implementing region-based security policies for cloud resources in accordance with another example embodiment. As shown in FIG. 8, system 800 includes an entity computing device 802, an authority system 804, an verification system 806, and a data center 808. Entity computing device 802 operates in a similar manner to entity computing device 134A and/or entity computing device 134N, authority system 804 operates in a similar manner to authority system 104A, verification system 806 operates in a similar manner to verification system 106, and data center 808 operates in a similar manner to data source 812, as each respectively described above in reference to FIGS. 1-6. As also shown in FIG. 8, data center 808 stores encrypted resource 810. System 800 may include any additional components not shown in FIG. 8 for brevity (e.g., additionally authority systems, additional entity computing devices, other data sources, policy managers, DB hosts, resource handlers, key managers, etc.). In accordance with an embodiment, verification system 706 is a LAP server. In accordance with an embodiment, verification system 806 is a trusted verification system (e.g., a verification system trusted by the authority of authority system 804 to verify whether access criteria of security policies of the authority is met, access decryption keys used to decrypt resources protected by such security policies, compute decryption keys used to decrypt resources protected by such security policies, and/or decrypt encrypted resources protected by such security policies).

As also shown in FIG. 8, authority system 804 is located in a first region 830A ("Region 830A" herein), and entity computing device 802 and data center 808 are located in a second region 830B ("Region 830B" herein). Verification system 806 in accordance with an embodiment is a global verification system distributed across many regions in a cloud computing platform. In accordance with another embodiment, verification system 806 is located in one of Region 830A, Region 830B, or another region not shown in FIG. 8 for brevity. Each of Regions 830A and 830B may include additional authority systems, entity computing devices, and/or data centers, not shown in FIG. 8 for brevity. Furthermore, embodiments of system 800 may include any number of regions in addition to and/or in lieu of Region 830A and/or Region 830B. In view of the foregoing context, several example scenarios are described below with respect to system 800.

In a first non-limiting example scenario, authority system 804 is associated with a government authority of Region 830A ("Authority 830A"), entity computing device 802 is a computing device of a citizen of Region 830A ("Citizen A") that possesses a "Citizen of Region 830" attribute ("Attribute A") and is on vacation in Region 830B, and encrypted resource 810 is private data of Citizen A protected by a region-based security policy of Authority 830A ("Policy A"). In this scenario, authority system 804 transmits an update request 812 to verification system 806. Update request 812 includes a request to update Policy A to limit access to private data of citizens of Region 830A so that only entities assigned to Region 830A (e.g., entities possessing Attribute A, or another attribute that indicates the entity is assigned to Region 830A) may access the private data. In this context, verification system 806 validates update request 812 (e.g., in a manner described with respect to step 304 of FIG. 3) and updates a policy map corresponding to Policy A (e.g., in a manner described with respect to step 306 of FIG. 3). By doing so, the access criteria required to access encrypted resource 810 is updated in a manner that assigns encrypted resource 810 to Region 830A, despite being stored in datacenter 808 located in Region 830B.

Suppose in this first example, Citizen A desired access to their private data (e.g., encrypted resource 810). Citizen A transmits a resource request 816 to verification system 806, the request is a request to access encrypted resource 810 and includes a proof that Citizen A possesses Attribute A. Verification system 806 determines the policy that protects encrypted resource 810 (e.g., Policy A) and determines if resource request 816 is valid utilizing the validation and verification techniques described elsewhere herein (e.g., as described with respect to steps 504-512 of FIG. 5A, steps 522 and 524 of FIG. 5B and/or steps 602-606 of FIG. 6). For instance, verification system 806 accesses an attribute map maintained by Authority A that maps entities of Region 830A to attributes assigned by Authority A. In this example, verification system 806 accesses the attribute map to obtain an encrypted version of Attribute A. Verification system 806 validates resource request 816 based at least on the encrypted version of Attribute A and the proof included in resource request 816. Verification system 806 verifies the access criteria of Policy A has been met and transmits a resource request 818 to datacenter 808 requesting encrypted resource 810. Verification system 806 receives response 820 including encrypted resource 810 and transmits a response 822 including encrypted resource 810 to entity computing device 802. Depending on the implementation, verification system 806 may decrypt encrypted resource 810, provide an encrypted version of a decryption key to entity computing device 802 for decrypting encrypted resource 810, or otherwise enable entity computing device 802 to access a decrypted version of encrypted resource 810. In this context, verification system 806 is able to validate and verify that both Citizen A and encrypted resource 810 are assigned to Region 830A (and therefore satisfying the access criteria of Policy A) despite being physically located in Region 830B.

In a second non-limiting example scenario, authority system 804 is associated with Authority 830A and encrypted resource 810 is private data of Citizen A protected by Policy A. However, entity computing device 802 is a computing device of a malicious user ("Infiltrator C") who has (e.g., physical) access to the (e.g., physical) storage device storing encrypted resource 810. In this context, Infiltrator C is not assigned to Region A. Despite Infiltrator C having access to the storage device storing encrypted resource 810, Infiltrator C is unable to decrypt encrypted resource 810 without validating with verification system 806. In this context, Infiltrator is unable to validate with verification system 806, as an access criteria of Policy A requires Infiltrator C to prove that Infiltrator C possesses Attribute A. Thus, Infiltrator C is unable to prove they possess the required attribute showing that they are a citizen of Region A, they are unable to access a decrypted version of encrypted resource 810.

In a third non-limiting example scenario, suppose Infiltrator C tampers with an attribute map maintained by Authority 830A to include an association between an identity of Infiltrator C and Attribute A. In this scenario, suppose Policy A (or verification system 806, or the ledger database that includes the attribute map) further requires Infiltrator C to provide a digest to validate the ledger database. In this context, Infiltrator C transmits a resource request 816 to verification system 806 that includes the digest of the tampered ledger database. Verification system 806 provides the digest to the ledger database, which (as described with respect to FIG. 6) determines if the ledger database is valid. In this scenario, the ledger database determines that the ledger database has been tampered with and access to encrypted resource 810 is not provided to Infiltrator C. In this scenario, verification system 806 may notify Authority 830A that the ledger database has been tampered with, as described elsewhere herein.

Thus, several example embodiments and scenarios for implementing region-based security policies have been described above with respect to system 700 of FIG. 7 and system 800 of FIG. 8. It should also be understood that similar systems may be used for implementing other region-based security policies, as described elsewhere herein.

VI. Example Mobile Device and Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
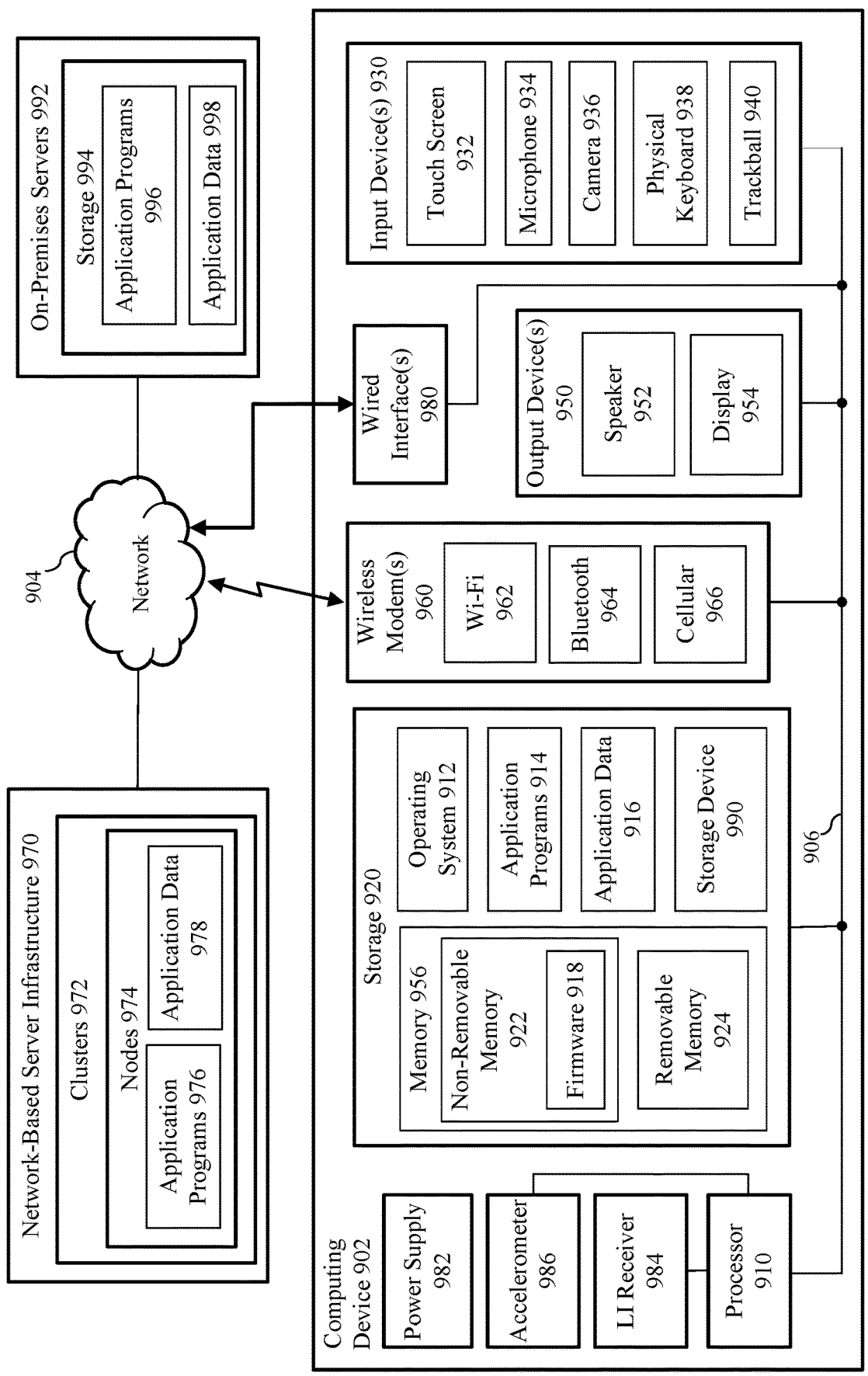
FIG. 9 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 9. FIG. 9 shows a block diagram of an exemplary computing environment 900 that includes a computing device 902. Computing device 902 is an example of entity computing devices 102A-102N, authority systems 104A-104N, verification system 106, additional entity computing devices 132, and/or entity computing devices 134A-134N of FIG. 1, entity computing device 702, authority system 704, verification system 706, and/or data center 708 of FIG. 7, and/or entity computing device 802, authority system 804, orchestrator system 806, and/or data center 808 of FIG. 8, each of which may include one or more of the components of computing device 902. In some embodiments, computing device 902 is communicatively coupled with devices (not shown in FIG. 9) external to computing environment 900 via network 904. Network 904 is an example of network 114 of FIG. 1, and comprises one or more networks such as local area networks (LANs), wide area networks (WANs), enterprise networks, the Internet, etc., and may include one or more wired and/or wireless portions. Network 904 may additionally or alternatively include a cellular network for cellular communications. Computing device 902 is described in detail as follows Computing device 902 can be any of a variety of types of computing devices. For example, computing device 902 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 902 may alternatively be a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, one or more input devices 930, one or more output devices 950, one or more wireless modems 960, one or more wired interfaces 980, a power supply 982, a location information (LI) receiver 984, and an accelerometer 986. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 902 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further buses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a SSD, a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing one or more of verification system 106, DB host 108, policy manager 110, data source 112, entity application 116A, authority application 120A ledger databases 124, resource handler 230, policy verifier 232, proof validator 234, identity map 236, attribute map 238, policy map 240, proof generator 242, attribute assigner 244, proof generator 248, key manager 284, proof requester 290, proof generator 448, verification system 706, verification system 806, along with any components and/or subcomponents thereof, as well as the flowcharts/flow diagrams (e.g., flowcharts 300, 310, 500, 520, 530, 540, and/or 600) described herein, including portions thereof, and/or further examples described herein.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 930 and may receive information from computing device 902 through one or more output devices 950. Input device(s) 930 may include one or more of touch screen 932, microphone 934, camera 936, physical keyboard 938 and/or trackball 940 and output device(s) 950 may include one or more of speaker 952 and display 954. Each of input device(s) 930 and output device(s) 950 may be integral to computing device 902 (e.g., built into a housing of computing device 902) or external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 may display information, as well as operating as touch screen 932 by receiving user commands and/or other information (e.g., by touch, finger gestures, virtual keyboard, etc.) as a user interface. Any number of each type of input device(s) 930 and output device(s) 950 may be present, including multiple microphones 934, multiple cameras 936, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi 962 modem (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 964 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and may receive power from a battery internal to computing device 902, and/or from a power cord plugged into a power port of computing device 902 (e.g., a USB port, an A/C power port). LI receiver 984 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 986 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

In some embodiments, server infrastructure 970 may be present in computing environment 900 and may be communicatively coupled with computing device 902 via network 904. Server infrastructure 970, when present, may be a network-accessible server set (e.g., a cloud computing platform). As shown in FIG. 9, server infrastructure 970 includes clusters 972. Each of clusters 972 may comprise a group of one or more compute nodes and/or a group of one or more storage nodes. For example, as shown in FIG. 9, cluster 972 includes nodes 974. Each of nodes 974 are accessible via network 904 (e.g., in a "cloud computing platform" or "cloud-based" embodiment) to build, deploy, and manage applications and services. Any of nodes 974 may be a storage node that comprises a plurality of physical storage disks, SSDs, and/or other physical storage devices that are accessible via network 904 and are configured to store data associated with the applications and services managed by nodes 974. For example, as shown in FIG. 9, nodes 974 may store application data 978.

Each of nodes 974 may, as a compute node, comprise one or more server computers, server systems, and/or computing devices. For instance, a node 974 may include one or more of the components of computing device 902 disclosed herein. Each of nodes 974 may be configured to execute one or more software applications (or "applications") and/or services and/or manage hardware resources (e.g., processors, memory, etc.), which may be utilized by users (e.g., customers) of the network-accessible server set. For example, as shown in FIG. 9, nodes 974 may operate application programs 976. In an implementation, a node of nodes 974 may operate or comprise one or more virtual machines, with each virtual machine emulating a system architecture (e.g., an operating system), in an isolated manner, upon which applications such as application programs 976 may be executed.

In an embodiment, one or more of clusters 972 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 972 may be a datacenter in a distributed collection of datacenters. In embodiments, exemplary computing environment 900 comprises part of a cloud-based platform such as Amazon Web Services® of Amazon Web Services, Inc. or Google Cloud Platform™ of Google LLC, although these are only examples and are not intended to be limiting.

In an embodiment, computing device 902 may access application programs 976 for execution in any manner, such as by a client application and/or a browser at computing device 902. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 902 may additionally and/or alternatively synchronize copies of application programs 914 and/or application data 916 to be stored at network-based server infrastructure 970 as application programs 976 and/or application data 978. For instance, operating system 912 and/or application programs 914 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 920 at network-based server infrastructure 970.

In some embodiments, on-premises servers 992 may be present in computing environment 900 and may be communicatively coupled with computing device 902 via network 904. On-premises servers 992, when present, are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 may be shared by on-premises servers 992 between computing devices of the organization, including computing device 902 (when part of an organization) through a local network of the organization, and/or through further networks accessible to the organization (including the Internet). Furthermore, on-premises servers 992 may serve applications such as application programs 996 to the computing devices of the organization, including computing device 902. Accordingly, on-premises servers 992 may include storage 994 (which includes one or more physical storage devices such as storage disks and/or SSDs) for storage of application programs 996 and application data 998 and may include one or more processors for execution of application programs 996. Still further, computing device 902 may be configured to synchronize copies of application programs 914 and/or application data 916 for backup storage at on-premises servers 992 as application programs 996 and/or application data 998.

Embodiments described herein may be implemented in one or more of computing device 902, network-based server infrastructure 970, and on-premises servers 992. For example, in some embodiments, computing device 902 may be used to implement systems, clients, or devices, or components/subcomponents thereof, disclosed elsewhere herein. In other embodiments, a combination of computing device 902, network-based server infrastructure 970, and/or on-premises servers 992 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 980 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

VII. Additional Example Embodiments

A system is described herein. The system includes a processor circuit and a memory. The memory stores program code that, when executed by the processor circuit, performs operations. The operations include receiving a resource request from an entity to access an encrypted resource. The operations further include, determining the encrypted resource is assigned to a first region and is protected by a region-based security policy. The operations further include, receiving a proof of a region attribute from the entity. The proof indicates the entity possesses the region attribute. The region attribute indicates the entity is associated with the first region. The operations further include, obtaining an encrypted attribute from a ledger database. The encrypted attribute is an encrypted version of the region attribute. The operations further include, validating the resource request based at least on the encrypted attribute and the proof of the region attribute. The operations further include, verifying that an access criteria of the region-based security policy is met. The operations further include, providing the entity with access to the encrypted resource.

In one implementation of the foregoing system, the encrypted resource is stored in a datacenter located in a second region separate from the first region.

In one implementation of the foregoing system, the first region is a first country, the entity is associated with the first country, and the second region is a second country.

In one implementation of the foregoing system, the entity is located in the first region, the entity is a citizen of the first region, the entity is an organization headquartered in the first region, the entity is a service assigned to the first region, or the entity is a government entity of the first region.

In one implementation of the foregoing system, the proof of the region attribute is included in the resource request.

In one implementation of the foregoing system, said receiving the proof of the region attribute from the entity comprises: transmitting a proof request to a computing device associated with the entity, the proof request prompting the entity to provide the proof of the region attribute; and receiving a response from the computing device associated with the entity, the response comprising the proof of the region attribute.

In one implementation of the foregoing system, the system comprises a trusted verification system, the trusted verification system authorized by an authority of the first region to perform said verifying the access criteria of the region-based security policy is met.

In one implementation of the foregoing system, the operations further comprise receiving a digest representative of a state of the ledger database. Said obtaining the encrypted attribute comprises: validating the ledger database based at least on the digest; and receiving, from the ledger database, a response comprising the encrypted attribute.

In one implementation of the foregoing system, the request is validated without decrypting the encrypted attribute.

In one implementation of the foregoing system, said providing the entity with access to the encrypted resource comprises decrypting the encrypted resource and providing the decrypted resource to the entity.

In one implementation of the foregoing system, said providing the entity with access to the encrypted resource comprises providing a decryption key to the entity for decrypting the resource.

In one implementation of the foregoing system, said providing the entity with access to the encrypted resource comprises authorizing a resource handler to decrypt the resource and provide the decrypted resource to the entity.

In one implementation of the foregoing system, the encrypted resource is associated with a user associated with the first region. The operations further comprise: receiving a storage request from a computing device on behalf of the user, the storage request comprising the encrypted resource; verifying the user is associated with the first region; assigning the encrypted resource to the first region; and storing the encrypted resource.

In one implementation of the foregoing system, said determining the encrypted resource is assigned to a first region and is protected by a region-based security policy comprises determining encrypted resource is encrypted by an encryption key of the region-based security policy.

A computer-implemented method is also disclosed herein. The computer-implemented method comprises: receiving a resource request from an entity to access an encrypted resource; determining the encrypted resource is assigned to a first region and is protected by a region-based security policy; receiving a proof of a region attribute from the entity, the proof indicates that the entity possesses the region attribute, the region attribute indicates the entity is associated with the first region; obtaining an encrypted attribute from a ledger database, the encrypted attribute is an encrypted version of the region attribute; validating the resource request based at least on the encrypted attribute and the proof of the region attribute; verifying that an access criteria of the region-based security policy is met; and providing the entity with access to the encrypted resource.

In one implementation of the foregoing computer-implemented method, the encrypted resource is stored in a datacenter located in a second region separate from the first region.

In one implementation of the foregoing computer-implemented method, the first region is a first country, the entity is associated with the first country, and the second region is a second country.

In one implementation of the foregoing computer-implemented method, the entity is located in the first region, the entity is a citizen of the first region, the entity is an organization headquartered in the first region, the entity is a service assigned to the first region, or the entity is a government entity of the first region.

In one implementation of the foregoing computer-implemented method, the proof of the region attribute is included in the resource request.

In one implementation of the foregoing computer-implemented method, said receiving the proof of the region attribute from the entity comprises: transmitting a proof request to a computing device associated with the entity, the proof request prompting the entity to provide the proof of the region attribute; and receiving a response from the computing device associated with the entity, the response comprising the proof of the region attribute.

In one implementation of the foregoing computer-implemented method, said verifying that the access criteria of the region of the region-based security policy is met comprises verifying that the access criteria is met by a verification system trusted by an authority of the first region.

In one implementation of the foregoing computer-implemented method, the method further comprises receiving a digest representative of a state of the ledger database. Said obtaining the encrypted attribute comprises: validating the ledger database based at least on the digest; and receiving, from the ledger database, a response comprising the encrypted attribute.

In one implementation of the foregoing computer-implemented method, the request is validated without decrypting the encrypted attribute.

In one implementation of the foregoing computer-implemented method, said providing the entity with access to the encrypted resource comprises: decrypting the encrypted resource and providing the decrypted resource to the entity; providing the entity with access to the encrypted resource comprises providing a decryption key to the entity for decrypting the resource; or authorizing a resource handler to decrypt the resource and provide the decrypted resource to the entity.

In one implementation of the foregoing computer-implemented method, the encrypted resource is associated with a user associated with the first region. The method further comprises: receiving a storage request from a computing device on behalf of the user, the storage request comprising the encrypted resource; verifying the user is associated with the first region; assigning the encrypted resource to the first region; and storing the encrypted resource.

In one implementation of the foregoing computer-implemented method, said determining the encrypted resource is assigned to a first region and is protected by a region-based security policy comprises determining encrypted resource is encrypted by an encryption key of the region-based security policy.

A computer-readable storage medium having program instructions recorded thereon is also described herein. When executed by a processor circuit, the program instructions perform a method. The method comprises: receiving a resource request from an entity to access an encrypted resource; determining the encrypted resource is assigned to a first region and is protected by a region-based security policy; receiving a proof of a region attribute from the entity, the proof indicates that the entity possesses the region attribute, the region attribute indicates the entity is associated with the first region; obtaining an encrypted attribute from a ledger database, the encrypted attribute is an encrypted version of the region attribute; validating the resource request based at least on the encrypted attribute and the proof of the region attribute; verifying that an access criteria of the region-based security policy is met; and providing the entity with access to the encrypted resource.

In one implementation of the foregoing computer-readable storage medium, the encrypted resource is stored in a datacenter located in a second region separate from the first region.

In one implementation of the foregoing computer-readable storage medium, the first region is a first country, the entity is associated with the first country, and the second region is a second country.

In one implementation of the foregoing computer-readable storage medium, the entity is located in the first region, the entity is a citizen of the first region, the entity is an organization headquartered in the first region, the entity is a service assigned to the first region, or the entity is a government entity of the first region.

In one implementation of the foregoing computer-readable storage medium, the proof of the region attribute is included in the resource request.

In one implementation of the foregoing computer-readable storage medium, said receiving the proof of the region attribute from the entity comprises: transmitting a proof request to a computing device associated with the entity, the proof request prompting the entity to provide the proof of the region attribute; and receiving a response from the computing device associated with the entity, the response comprising the proof of the region attribute.

In one implementation of the foregoing computer-readable storage medium, said verifying that the access criteria of the region of the region-based security policy is met comprises verifying that the access criteria is met by a verification system trusted by an authority of the first region.

In one implementation of the foregoing computer-readable storage medium, the method further comprises receiving a digest representative of a state of the ledger database. Said obtaining the encrypted attribute comprises: validating the ledger database based at least on the digest; and receiving, from the ledger database, a response comprising the encrypted attribute.

In one implementation of the foregoing computer-readable storage medium, the request is validated without decrypting the encrypted attribute.

In one implementation of the foregoing computer-readable storage medium, said providing the entity with access to the encrypted resource comprises: decrypting the encrypted resource and providing the decrypted resource to the entity; providing a decryption key to the entity for decrypting the resource; or authorizing a resource handler to decrypt the resource and provide the decrypted resource to the entity.

In one implementation of the foregoing computer-readable storage medium, the encrypted resource is associated with a user associated with the first region. The method further comprises: receiving a storage request from a computing device on behalf of the user, the storage request comprising the encrypted resource; verifying the user is associated with the first region; assigning the encrypted resource to the first region; and storing the encrypted resource.

In one implementation of the foregoing computer-readable storage medium, said determining the encrypted resource is assigned to a first region and is protected by a region-based security policy comprises determining encrypted resource is encrypted by an encryption key of the region-based security policy.

VIII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, verification systems, ledger databases, resource handlers, policy verifiers, proof validators, key managers, policy managers, attribute assigners, and/or proof generators and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:
  a processor circuit; and
  a memory that stores program code that, when executed by the processor circuit, performs operations, the operations comprising:
    receiving a resource request from an entity to access an encrypted resource;
    determining the encrypted resource is assigned to a first region and is protected by a region-based security policy;

receiving a proof of a region attribute from the entity, the proof indicating the entity possesses the region attribute, the region attribute indicating the entity is associated with the first region;

obtaining an encrypted attribute from a ledger database, the encrypted attribute being an encrypted version of the region attribute;

validating the resource request based at least on the encrypted attribute and the proof of the region attribute;

verifying an access criteria of the region-based security policy is met; and providing the entity with access to the encrypted resource.

2. The system of claim 1, wherein the encrypted resource is stored in a datacenter located in a second region separate from the first region.

3. The system of claim 2, wherein the first region is a first country, the entity is associated with the first country, and the second region is a second country.

4. The system of claim 1, wherein the region attribute indicates at least one of:
the entity is located in the first region;
the entity is a citizen of the first region;
the entity is an organization headquartered in the first region;
the entity is a service assigned to the first region; or
the entity is a government entity of the first region.

5. The system of claim 1, wherein said providing the entity with access to the encrypted resource comprises:
providing a decryption key to the entity for decrypting the resource.

6. The system of claim 1, wherein the system comprises a trusted verification system, the trusted verification system authorized by an authority of the first region to perform said verifying the access criteria of the region-based security policy is met.

7. The system of claim 1, wherein:
the encrypted resource is associated with a user associated with the first region; and
the operations further comprise:
receiving a storage request from a computing device on behalf of the user, the storage request comprising the encrypted resource;
verifying the user is associated with the first region;
assigning the encrypted resource to the first region; and
storing the encrypted resource.

8. A computer-implemented method comprising:
receiving a resource request from an entity to access an encrypted resource;
determining the encrypted resource is assigned to a first region and is protected by a region-based security policy;
receiving a proof of a region attribute from the entity, the proof indicating the entity possesses the region attribute, the region attribute indicating the entity is associated with the first region;
obtaining an encrypted attribute from a ledger database, the encrypted attribute being an encrypted version of the region attribute;
validating the resource request based at least on the encrypted attribute and the proof of the region attribute;
verifying that an access criteria of the region-based security policy is met; and
providing the entity with access to the encrypted resource.

9. The computer-implemented method of claim 8, wherein the encrypted resource is stored in a datacenter located in a second region separate from the first region.

10. The computer-implemented method of claim 9, wherein the first region is a first country, the entity is associated with the first country, and the second region is a second country.

11. The computer-implemented method of claim 8, wherein the region attribute indicates at least one of:
the entity is located in the first region;
the entity is a citizen of the first region;
the entity is an organization headquartered in the first region;
the entity is a service assigned to the first region; or
the entity is a government entity of the first region.

12. The computer-implemented method of claim 8, wherein the proof of the region attribute is included in the resource request.

13. The computer-implemented method of claim 8, wherein said receiving the proof of the region attribute from the entity comprises:
transmitting a proof request to a computing device associated with the entity, the proof request prompting the entity to provide the proof of the region attribute; and
receiving a response from the computing device associated with the entity, the response comprising the proof of the region attribute.

14. The computer-implemented method of claim 8, wherein said verifying that the access criteria of the region of the region-based security policy is met comprises verifying that the access criteria is met by a verification system trusted by an authority of the first region.

15. The computer-implemented method of claim 8, wherein the request is validated without decrypting the encrypted attribute.

16. The computer-implemented method of claim 8, wherein said providing the entity with access to the encrypted resource comprises one of:
decrypting the encrypted resource and providing the decrypted resource to the entity;
providing a decryption key to the entity for decrypting the resource; or
authorizing a resource handler to decrypt the resource and provide the decrypted resource to the entity.

17. The computer-implemented method of claim 8, wherein:
the encrypted resource is associated with a user associated with the first region; and
the method further comprises:
receiving a storage request from a computing device on behalf of the user, the storage request comprising the encrypted resource;
verifying the user is associated with the first region;
assigning the encrypted resource to the first region; and
storing the encrypted resource.

18. The computer-implemented method of claim 8, wherein said determining the encrypted resource is assigned to a first region and is protected by a region-based security policy comprises determining encrypted resource is encrypted by an encryption key of the region-based security policy.

19. A computer-readable storage medium having program instructions recorded thereon that, when executed by a processor circuit perform a method, the method comprising:
receiving a resource request from an entity to access an encrypted resource;

determining the encrypted resource is assigned to a first region and is protected by a region-based security policy;

receiving a proof of a region attribute from the entity, the proof indicating the entity possesses the region attribute, the region attribute indicating the entity is associated with the first region;

obtaining an encrypted attribute from a ledger database, the encrypted attribute being an encrypted version of the region attribute;

validating the resource request based at least on the encrypted attribute and the proof of the region attribute;

verifying that an access criteria of the region-based security policy is met; and providing the entity with access to the encrypted resource.

20. The computer-readable storage medium of claim 19, wherein said determining the encrypted resource is assigned to a first region and is protected by a region-based security policy comprises determining encrypted resource is encrypted by an encryption key of the region-based security policy; and said providing the entity with access to the encrypted resource comprises one of:
decrypting the encrypted resource and providing the decrypted resource to the entity,
providing a decryption key to the entity for decrypting the resource, or
authorizing a resource handler to decrypt the resource and provide the decrypted resource to the entity.

* * * * *